(12) United States Patent
Su et al.

(10) Patent No.: US 12,544,447 B2
(45) Date of Patent: Feb. 10, 2026

(54) NUCLEASE-DENDRIMER FORMULATIONS FOR COVID-19 AND BROAD-SPECTRUM ANTIVIRAL THERAPY AND PROPHYLAXIS

(71) Applicant: Fulu Labs Corporation, Houston, TX (US)

(72) Inventors: Xiaohua Su, Houston, TX (US); Leonid I. Rudin, San Marino, CA (US)

(73) Assignee: Fulu Labs Corporation, Houston, TX (US)

( * ) Notice: Subject to any disclaimer, the term of this patent is extended or adjusted under 35 U.S.C. 154(b) by 0 days.

(21) Appl. No.: 18/604,387

(22) Filed: Mar. 13, 2024

(65) Prior Publication Data

US 2025/0009887 A1   Jan. 9, 2025

Related U.S. Application Data

(63) Continuation of application No. 17/367,357, filed on Jul. 3, 2021, now abandoned.

(60) Provisional application No. 63/166,407, filed on Mar. 26, 2021, provisional application No. 63/083,493, filed on Sep. 25, 2020, provisional application No. 63/063,419, filed on Aug. 9, 2020.

(51) Int. Cl.
*A61K 47/54* (2017.01)
*A61P 31/14* (2006.01)

(52) U.S. Cl.
CPC ............. *A61K 47/54* (2017.08); *A61P 31/14* (2018.01)

(58) Field of Classification Search
CPC ........ A61K 47/54; A61K 47/595; A61P 31/14
See application file for complete search history.

(56) References Cited

U.S. PATENT DOCUMENTS

| | | |
|---|---|---|
| 5,484,589 A | 1/1996 | Salganik |
| 5,795,582 A | 8/1998 | Wright |
| 6,190,650 B1 | 2/2001 | Matthews et al. |
| 7,235,583 B1 | 6/2007 | Webb et al. |
| 9,592,277 B2 | 3/2017 | Appelbaum et al. |
| 10,335,372 B2 | 7/2019 | Applebaum |
| 2014/0294851 A1 | 10/2014 | Nguyen |
| 2022/0040315 A1 | 2/2022 | Su et al. |

FOREIGN PATENT DOCUMENTS

| | | |
|---|---|---|
| WO | WO-2019198068 A1 | 10/2019 |
| WO | WO-2022035789 A1 | 2/2022 |

OTHER PUBLICATIONS

Ellis, Gregory A., Megan L. Hornung, and Ronald T. Raines. "Potentiation of ribonuclease cytotoxicity by a poly (amidoamine) dendrimer." Bioorganic & medicinal chemistry letters 21.9 (2011): 2756-2758. (Year: 2011).*

Ilinskaya, O. N., and R. Shah Mahmud. "Ribonucleases as antiviral agents." Molecular Biology 48.5 (2014): 615-623. (Year: 2014).*

Abbott et al., "Development of CRISPR as an antiviral strategy to combat SARS-CoV-2 and influenza". Cell. May 14, 2020; 181(4): 865-76.

Dijkman et al., "The dominance of human coronavirus OC43 and NL63 infections in infants". Journal of Clinical Virology. Feb. 1, 2012; 53(2): 135-9.

Drayman et al. "Masitinib is a broad coronavirus 3CL inhibitor that blocks replication of SARS-CoV-2". Science. Aug. 20, 2021; 373(6557): 931-6.

Dubois et al., "Cationic poly (amidoamine) promotes cytosolic delivery of bovine RNase A in melanoma cells, while maintaining its cellular toxicity". Journal of Materials Chemistry B. 2015; 3(31): 6501-8.

Ellis et al., "Potentiation of ribonuclease cytotoxicity by a poly (amidoamine) dendrimer". Bioorganic & Medicinal Chemistry Letters. May 1, 2011; 21(9): 2756-8.

Ferruti et al., "Poly (amidoamine) s: Past, present, and perspectives. Journal of Polymer Science Part A: Polymer Chemistry". Jun. 2013; 51(11): 2319-53.

Futami et al., "Optimum modification for the highest cytotoxicity of cationized ribonuclease". The Journal of Biochemistry. 2002; 132(2): 223-8.

Futami et al., "Preparation of potent cytotoxic ribonucleases by cationization: enhanced cellular uptake and decreased interaction with ribonuclease inhibitor by chemical modification of carboxyl groups". Biochemistry. Jun. 26, 2001; 40(25): 7518-24.

Gupta et al., "Dendrimers: A review on synthetic approaches". Journal of Applied Pharmaceutical Science. Mar. 28, 2015; 5(3): 117-22.

Illinskaya et al., "Cytotoxicity of RNases is increased by cationization and counteracted by KCa channels". Biochemical and biophysical research communications. Feb. 6, 2004; 314(2): 550-4.

Illinskaya et al., "Ribonucleases as antiviral agents". Molecular Biology. Sep. 2014; 48: 615-23.

International Preliminary Report issued in International Application No. PCT/US2021/045282 mailed Feb. 7, 2023, 9 pages.

International Search Report and Written issued in International Application No. PCT/US2021/045282 mailed Dec. 28, 2021, 10 pages.

(Continued)

*Primary Examiner* — Jeanette M Lieb
*Assistant Examiner* — David Paul Bowles
(74) *Attorney, Agent, or Firm* — FisherBroyles, LLP

(57) ABSTRACT

Compositions of nucleases in formulations with dendrimers are used in pharmaceutically effective dosages as therapeutics for covid-19 and a broad spectrum of viruses in various embodiments. When cationized nucleases are mixed and/or complexed with a dendrimer, an unexpected positive dendrimer effect is manifest. This positive dendrimer effect is shown to be highly effective for catalyzing anti-viral RNase properties. In various embodiments compositions of cationized nucleases in combination with a dendrimer demonstrated this synergistic amplification of anti-viral effectiveness and are used in pharmaceutically effective dosages as therapeutics against covid-19 and a broad spectrum of viruses. An exemplar formulation which exhibits a positive dendrimer effect is cationized RNase A mixed and/or complexed with gen 2 PAMAM dendrimer.

13 Claims, 25 Drawing Sheets

(56) References Cited

OTHER PUBLICATIONS

Keiser et al., "Automation of infectious focus assay for determination of filovirus titers and direct comparison to plaque and TCID50 assays". Microorganisms. Jan. 12, 2021; 9(1): pp. 1-13.
Leland et al., "Ribonuclease A variants with potent cytotoxic activity". Proceedings of the National Academy of Sciences. Sep. 1, 1998; 95(18): 10407-12.
Liu et al., "Human coronavirus-229E,-OC43,-NL63, and-HKU1 (Coronaviridae)". Encyclopedia of virology. 2021: 13 pages.
Michen et al., "Isoelectric points of viruses. Journal of applied microbiology". Aug. 1, 2010; 109(2): 388-97.
Mitkevich et al., Cytotoxicity of RNase Sa to the acute myeloid leukemia Kasumi-1 cells depends on the net charge. Oncoscience. 2014; 1(11): 7 pages.
Mohanraju, et al., "Diverse evolutionary roots and mechanistic variations of the CRISPR-Cas systems"; Science; vol. 353, No. 6299, 14 pages (Aug. 5, 2016).
Mousavizadeh et al., "Genotype and phenotype of COVID-19: Their roles in pathogenesis". Journal of Microbiology, Immunology and Infection. Apr. 1, 2021; 54(2): 159-63.
Ranucci et al., "Polyamidoamines: Versatile bioactive polymers with potential for biotechnological applications". Chemistry Africa. Jun. 1, 2019; 2(2): 167-93.
Salganik et al., "Effect of Deoxyribonuclease on the Course of Lymphatic Leukaemia in AKR Mice". Nature 214, 100-102 (1967). https://doi.org/10.1038/214100a0.
Salganik et al., Inhibition of RNA synthesis and reproduction of tick-encephalitis virus under the influence of ribonuclease. Doklady Akademii nauk SSSR. Jun. 21, 1968; 180(6): 1473-5.
Ulyanova et al., "Anti-influenza activity of the ribonuclease binase: Cellular targets detected by quantitative proteomics". International Journal of Molecular Sciences. Nov. 5, 2020; 21(21): 23 pages.
Wang et al., "Clinical characteristics of 138 hospitalized patients with 2019 novel coronavirus-infected pneumonia in Wuhan, China. Jama". Mar. 17, 2020; 323(11): 1061-9.

\* cited by examiner

P = Nuclease -- exemplars:

RNase A (n = 11)
    [e.g. ranpirnase, onconase]
RNase I (n = 13)
HEL (n = 10)
Rnase T, T1, T2 (n = v, w, x)
DNase I (n = y)
DNase A (n = z)

---

R = $NH_3^+$   (ethylenediamine)
    OH     (2-aminoethanol)
    $SO_3$   (taurine)
m = 1 - 10

---

EDC = 1-Ethyl-3-[3-(diniethylarnmo)propyl]carbodiimide hydrochloride
    concentration = 1mg/ml to 25mg/ml

| Experiment | Virus only | Dendrimer 50uM | Rnase/Dnase 0.25mg/ml | Rnase/Dnase+Dendrimer 0.25mg/ml +50uM | High-Rnase 0.75ug/ml | Mild-Rnase 7.5ug/ml | Mild-Rnase 10ug/ml | Mild+Dendri 7.5ug/ml+ 50uM | Mild+Dendri 10ug/ml+ 50uM | Mild+Dendri 10ug/ml+ 100uM | Mild+Dendri 20ug/ml+ 50uM | Mild+Dendri 20ug/ml+ 100uM |
|---|---|---|---|---|---|---|---|---|---|---|---|---|
| 1 | 0 | — | 0.8 | — | — | — | — | — | — | — | — | — |
| 2 | 0 | 0.8 | 0.8 | 1 | — | 0.8 | — | — | — | — | — | — |
| 4 | 0 | 0.3 or 1 | — | — | 0 | -0.3 | -0.8 | — | — | — | — | — |
| 5 | 0 | 1.7 | — | — | — | — | — | 3.6 | 4.3 | — | — | — |
| 6 | 0 | — | — | — | — | — | — | — | 5.5 | 5.5 | 5.5 | 5.5 |

Table values showing viral reductions are expressed on $\log_{10}$ scale

FIG. 29

Experimental Components

|  | stock |  | 10x | final |
|---|---|---|---|---|
| Tris-HCl | 1M | 1x | 1M | 0.1M |
| NaCl | 5M | 5x | 1M | 0.1M |
| tRNA | 10mg/ml | 1x | 10µg/µl | 0.5ug/µl |
| Rnase | 10mg/ml | 2000x | 5ng/µl | 0.5ng/µl |
| M-Rnase | 0.1mg/ml | 500x | 0.2ng/µl | 0.02ng/µl |

FIG. 30 total RNA Base/Mix formulation

| $H_2O$ | 5 | 50 | 100 |
|---|---|---|---|
| Tris-HCl | 1 | 10 | 20 |
| NaCl | 1 | 10 | 20 |
| tRNA | 1 | 10 | 20 |

FIG. 31

Experimental formulations

|  | 1 | 2 | 3 | 4 | 5 | 6 |
|---|---|---|---|---|---|---|
|  | control | Rnase | Dendrimer | m-Rnase | Rnase+Dend | M-Rnase+Dend |
|  | 3µl | 10ng | 0.1µM | 0.02ng/µl | 5ng+0.1µM | 0.02ng+0.1µM |
| $H_2O$ | 2 | 1 | 1 | 1 | 0 | 0 |
| Rnase | 0 | 1 | 0 | 0 | 1 | 0 |
| M-Rnase | 0 | 0 | 0 | 1 | 0 | 1 |
| Dendrimer | 0 | 0 | 1 | 0 | 1 | 1 |
| base/mix | 8 | 8 | 8 | 8 | 8 | 8 |

FIG. 32

NUCLEASE-DENDRIMER FORMULATIONS FOR COVID-19 AND BROAD-SPECTRUM ANTIVIRAL THERAPY AND PROPHYLAXIS

RELATED APPLICATION

This patent application is a continuation of U.S. patent application Ser. No. 17/367,357 filed on Jul. 3, 2021, which claims priority to U.S. Provisional Patent application No. 63/063,419 filed on Aug. 9, 2020, U.S. Provisional Patent application No. 63/083,493 filed on Sep. 25, 2020, and U.S. Provisional Patent application No. 63/166,407 filed on Mar. 26, 2021 the disclosures of which are hereby incorporated by reference in their entireties for all purposes.

FIELD OF THE INVENTION

The field of the invention is antiviral therapeutic compositions, including compositions pharmaceutically effective in treating human Covid-19 virus infections.

BRIEF DESCRIPTION OF THE DRAWINGS

FIG. 29 is a table comparatively summarizing all experimental results for anti-viral effectiveness in reducing viral load.

FIG. 30 depicts a table showing the components for the described experiments.

FIG. 31 depicts a table showing the components of the base composition used in the described experiment.

FIG. 32 is a table showing the formulations tested in the described experiment.

DESCRIPTION

Figure 1:
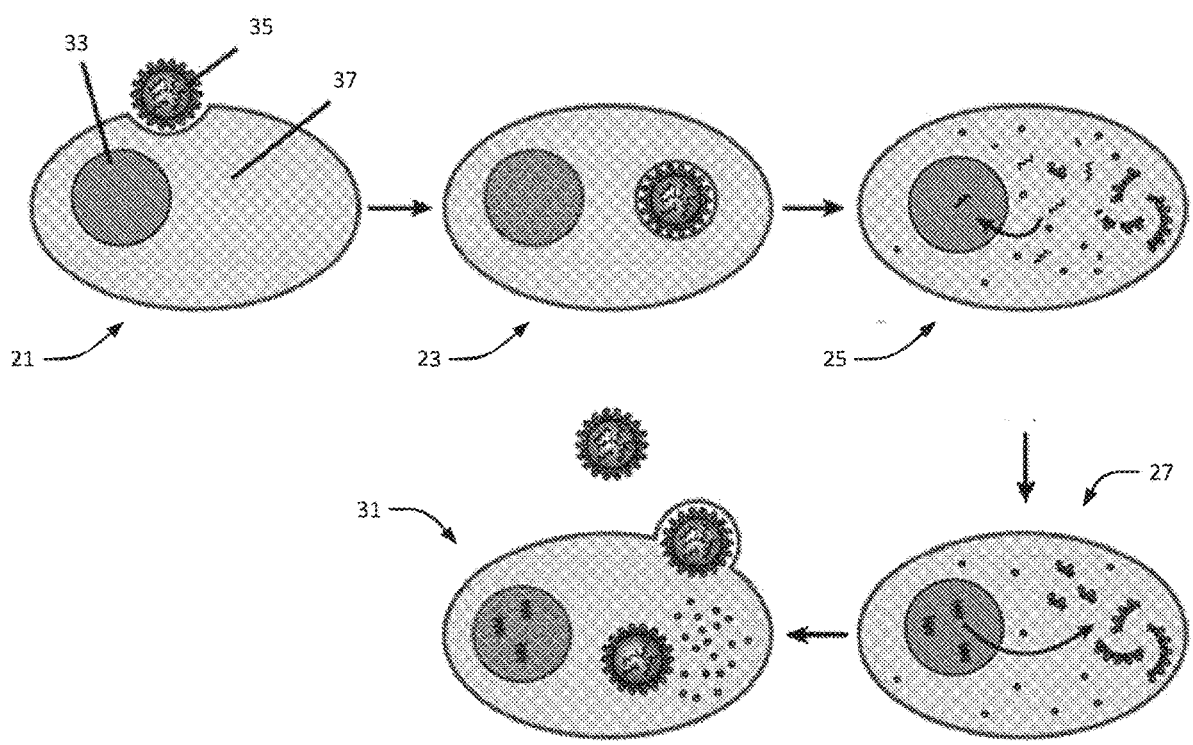
FIG. 1 is a diagram showing an exemplar process of virus replication.

Compounds which are useful for the treatment and prophylaxis of viral infections, particularly coronaviral infections, including diseases associated with coronaviral infections in living hosts, are provided. In particular, provided are compounds and compositions and/or methods for the treatment and prophylaxis of coronaviruses, such as covid-19. However, prior to providing further detail, the following terms will first be defined.

The following publications are incorporated by reference with regards to the preparation of cationized nucleases: Futami, Junichiro, et al. "Preparation of potent cytotoxic ribonucleases by cationization: enhanced cellular uptake and decreased interaction with ribonuclease inhibitor by chemical modification of carboxyl groups." *Biochemistry* 40.25

(2001): 7518-7524; Futami, Junichiro, et al. "Optimum modification for the highest cytotoxicity of cationized ribonuclease." *The Journal of Biochemistry* 132.2 (2002): 223-228.

DEFINITIONS

In accordance with this description, the following abbreviations and definitions apply. It must be noted that as used herein, the singular forms "a," "an," and "the" include plural referents, unless the context clearly dictates otherwise.

Any publications discussed herein are provided solely for their disclosure. Nothing herein is to be construed as an admission regarding antedating the publications. Further, the dates of publication provided may be different from the actual publication dates, which may need to be independently confirmed.

Where a range of values is provided, it is understood that each intervening value is encompassed. The upper and lower limits of these smaller ranges may independently be included in the smaller, subject to any specifically excluded limit in the stated range. Where the stated range includes one or both of the limits, ranges excluding either one or both of those included limits are also included in the invention. Also contemplated are any values that fall within the cited ranges.

Unless defined otherwise, all technical and scientific terms used herein have the same meaning as commonly understood by one of ordinary skill in the art. Any methods and materials similar or equivalent to those described herein can also be used in practice or testing. All publications mentioned herein are incorporated herein by reference to disclose and describe the methods and/or materials in connection with which the publications are cited.

By "patient" or "subject" is meant to include any mammal. A "mammal," for purposes of treatment, refers to any animal classified as a mammal, including but not limited to, humans, experimental animals including rats, mice, and guinea pigs, domestic and farm animals, and zoo, sports, or pet animals, such as dogs, horses, cats, cows, and the like.

The term "efficacy" as used herein in the context of a chronic dosage regime refers to the effectiveness of a particular treatment regime. Efficacy can be measured based on change of the course of the disease in response to an agent.

The term "success" as used herein in the context of a chronic treatment regime refers to the effectiveness of a particular treatment regime. This includes a balance of efficacy, toxicity (e.g., side effects and patient tolerance of a formulation or dosage unit), patient compliance, and the like. For a chronic administration regime to be considered "successful" it must balance different aspects of patient care and efficacy to produce a favorable patient outcome.

The terms "treating," "treatment," and the like are used herein to refer to obtaining a desired pharmacological and physiological effect. The effect may be prophylactic in terms of preventing or partially preventing a disease, symptom, or condition thereof and/or may be therapeutic in terms of a partial or complete cure of a disease, condition, symptom, or adverse effect attributed to the disease.

The term "treatment," as used herein, covers any treatment of a disease in a mammal, such as a human, and includes: (a) preventing the disease from occurring in a subject which may be predisposed to the disease but has not yet been diagnosed as having it, i.e., causing the clinical symptoms of the disease not to develop in a subject that may be predisposed to the disease but does not yet experience or display symptoms of the disease; (b) inhibiting the disease, i.e., arresting or reducing the development of the disease or its clinical symptoms; and (c) relieving the disease, i.e., causing regression of the disease and/or its symptoms or conditions. Treating a patient's suffering from disease related to pathological inflammation is contemplated. Preventing, inhibiting, or relieving adverse effects attributed to pathological inflammation over long periods of time and/or are such caused by the physiological responses to inappropriate inflammation present in a biological system over long periods of time are also contemplated.

"Optionally substituted" means that the recited group may be unsubstituted or the recited group may be substituted.

"Pharmaceutically-acceptable carrier" means a carrier that is useful in preparing a pharmaceutical composition or formulation that is generally safe, non-toxic, and neither biologically nor otherwise undesirable, and includes a carrier that is acceptable for veterinary use as well as human pharmaceutical use. A pharmaceutically-acceptable carrier or excipient includes both one or more than one of such carriers.

"Pharmaceutically-acceptable cation" refers to the cation of a pharmaceutically-acceptable salt.

"Pharmaceutically-acceptable salt" refers to salts which retain the biological effectiveness and properties of compounds which are not biologically or otherwise undesirable. Pharmaceutically-acceptable salts refer to pharmaceutically-acceptable salts of the compounds, which salts are derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, tartrate, mesylate, acetate, maleate, oxalate and the like.

"Treating" or "treatment" of a disease includes:
preventing the disease, i.e. causing the clinical symptoms of the disease not to develop in a mammal that may be exposed to or predisposed to the disease but does not yet experience or display symptoms of the disease;
inhibiting the disease, i.e., arresting or reducing the development of the disease or its clinical symptoms, or;
relieving the disease, i.e., causing regression of the disease or its clinical symptoms.

A "therapeutically-effective amount" means the amount of a compound or antibody that, when administered to a mammal for treating a disease, is sufficient to effect such treatment for the disease. The "therapeutically-effective amount" will vary depending on the compound, the disease, and its severity and the age, weight, etc., of the mammal to be treated.

Provided are compounds and compositions and/or methods for the treatment and prophylaxis of viral infections, as well as diseases associated with viral infections in living hosts. In particular, provided are compounds and compositions and/or methods for the treatment and prophylaxis of a coronavirus, such as covid-19.

A compound may act as a pro-drug. Pro-drug means any compound which releases an active parent drug in vivo when such pro-drug is administered to a mammalian subject. Pro-drugs are prepared by modifying functional groups present in such a way that the modifications may be cleaved in vivo to release the parent compound. Prodrugs include compounds wherein a hydroxy, amino, or sulfhydryl group is bonded to any group that may be cleaved in vivo to regenerate the free hydroxyl, amino, or sulfhydryl group, respectively. Examples of prodrugs include, but are not limited to esters (e.g., acetate, formate, and benzoate derivatives), carbamates (e.g., N,N-dimethylamino-carbonyl) of hydroxy functional groups, and the like.

In an embodiment, a method for the treatment or prophylaxis of a viral infection or disease associated therewith, comprising administering in a therapeutically effective amount to a mammal in need thereof, a compound of cationized nuclease or a pharmaceutically acceptable salt thereof is provided. In another embodiment, a pharmaceutical composition that comprises a pharmaceutically-effective amount of the compound or a pharmaceutically-acceptable salt thereof, and a pharmaceutically-acceptable carrier is provided. In addition, compounds of cationized nuclease, as well as pharmaceutically-acceptable salts thereof are provided. An unexpected substantial anti-viral effectiveness was measured for mixtures and/or complexes of certain cationized nucleases with dendrimers. It is proposed that the unexpected anti-viral effect of mixing the dendrimer with the cationized nuclease is a result of the Positive Dendrimer Effect which has not been previously shown with Dendriemer-RNase compositions. As shown and detailed below, adding the disclosed dendrimer to cationized RNase impacted the catalytic activity effectiveness of the RNase exponentially by at least 4 $\log_{10}$ to 5 $\log_{10}$.

To confirm that the Positive Dendrimer Effect mechanism is a catalytic effect on the enzymatic action of the RNase, experiments are performed to determine the direct action of the composition on transfer RNA or tRNA from yeast tRNA purified from brewer's yeast. By measuring the direct effect of the composition on the tRNA, experimental results are able to confirm the intracellular mechanism of the Positive Dendrimer Effect.

The present disclosure is directed in part to methods of treating and/or preventing viral infections comprising administering a therapeutically effective amount of cationized nucleases alone or in combination, or a derivative thereof, an isomer or product of cationized nucleases, or a pharmaceutically equivalent compound for thereof to a subject, such as a mammal. Also disclosed are methods for the discovery of therapeutically effective and therapeutically safe formulations of cationized nucleases treating and/or preventing viral infections.

A breakdown of the human genome demonstrates the depth of endemic viral interaction with humans. The so-called "legacy of virus" portion of the genome, is five to six times the relative proportion of the combined protein encoding DNA. This paleo-virology persists as a clear and present public health danger which has manifested as the Covid-19 coronavirus pandemic. The danger posed to public health by a viral pandemic is not simply long-standing, it is as old as modern man.

Medicine has limited effective solutions available for the prevention and treatment of viral infections. Using the current pandemic as an example, as the virus spreads nearly unchecked in some areas of the world, no vaccine is available, and only supportive care is available as an effort to limit organ damage. No anti-viral therapeutic capable of complete disruption of the virus is available.

Most public health professionals consider the development of vaccines to be the most likely means of mitigating the viral pandemic, however, vaccine development has more limitations than is widely reported to the public. Vaccine effectiveness against all variants of a virus face at a minimum, three significant hurdles:

a glycan shield covers the virus surface, insulating or otherwise preventing antibodies from recognizing antigens under the shield;

genetic variation, such as a mutation of the viral RNA which results in modified proteins such that they cannot be recognized by antibodies;

conformational masking or the virus's ability to change its three-dimensional structure, as shown in the bottom of last column, epitopes (can be recognized by antibodies) are masked, and viruses only expose those epitopes when they need them to bind to host cells.

As an illustration of the process of viral replication, FIG. 1 presents several stages of an exemplar virus infection. At the first stage 21, the influenza virus 35 becomes attached to a target epithelial cell 37. Shown also is the cell nucleus 33 which contains the nucleic material utilized in later stages for viral replication. At the second stage 23, the cell engulfs the virus by endocytosis. The third stage 25 shows the viral contents being released. Viral RNA enters the nucleus where it is replicated by the RNA polymerase. Stage four 27 shows viral messenger RNA (mRNA) being used to make viral proteins. Lastly, at stage five 31, new viral particles are made and released into the extracellular fluid. The cell, which is not killed in the process, continues to make the new virus. Thus, by the process of viral endocytosis and RNA replication, a single host cell can replicate a million copies of the virus.

Figure 2:
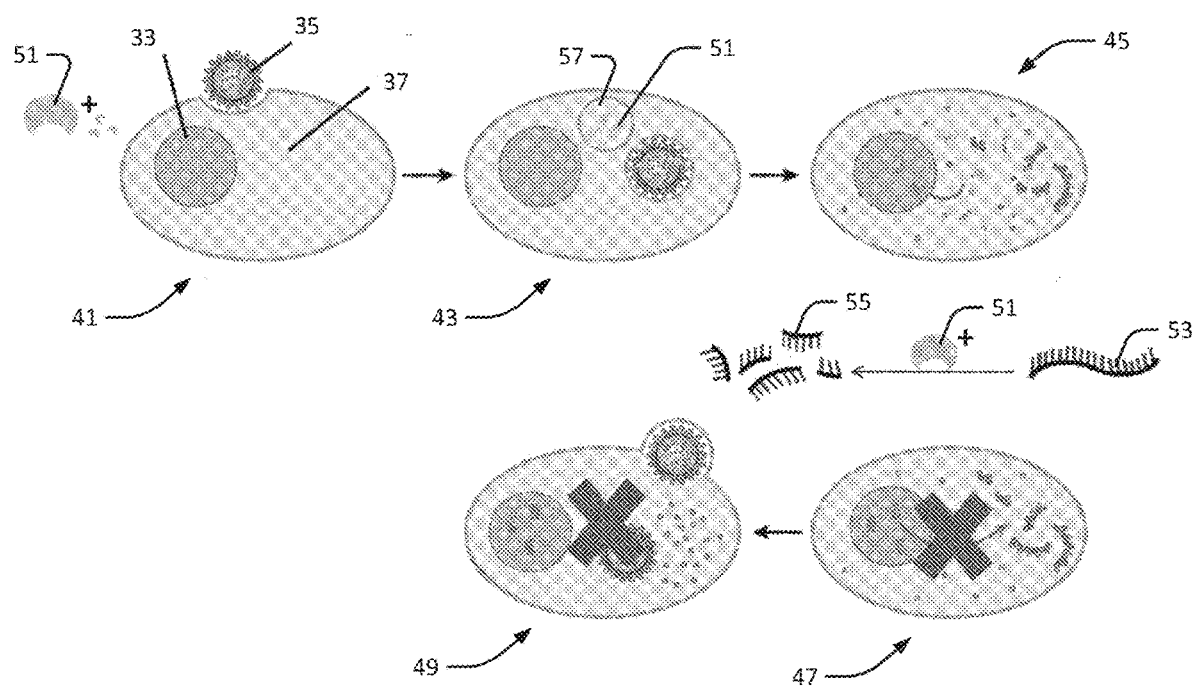
FIG. 2 is a diagram showing an exemplar process for cationized nuclease disruption of viral RNA replication.

FIG. 2 diagrammatically shows a mechanism by which an exemplar disclosed therapeutic or method disrupts viral replication. The mechanism of FIG. 2 is presented as five stages, the last 2 stages being disrupted by the disclosed therapeutic or method. At the first stage 41, the virus 35 becomes attached to a target epithelial cell 37 (with nucleus 33), here in the presence of a disclosed cationized nuclease 51. At the second stage 43, the cell engulfs the virus and the cationized (with extra charge marked with "+") nuclease 51 by endocytosis 57. The third stage 45 shows the viral contents being released, in the presence of the cationized nuclease. At this stage, the cationized nuclease 51 is electrochemically affiliated to the viral RNA 53 and cleaves the viral RNA 55, effectively disrupting the virus replication. Thus in the cationized nuclease disrupted virus replication process, stage four 47 and stage five 49 are prevented.

Introduced above, ribonuclease (commonly abbreviated RNase) is a protein-enzyme, a type of nuclease that catalyzes the degradation of RNA into smaller components. Similarly, a deoxyribonuclease (DNase, for short) is an enzyme that catalyzes the hydrolytic cleavage of phosphodiester linkages in the DNA backbone, thus degrading DNA. RNase A is an RNase that is commonly used in research (e.g., bovine pancreatic ribonuclease A) and is one of the robust enzymes in common lab usage. Exemplar effective nucleases disclosed for the treatment and method identified herein are further discussed below.

Figure 3A:
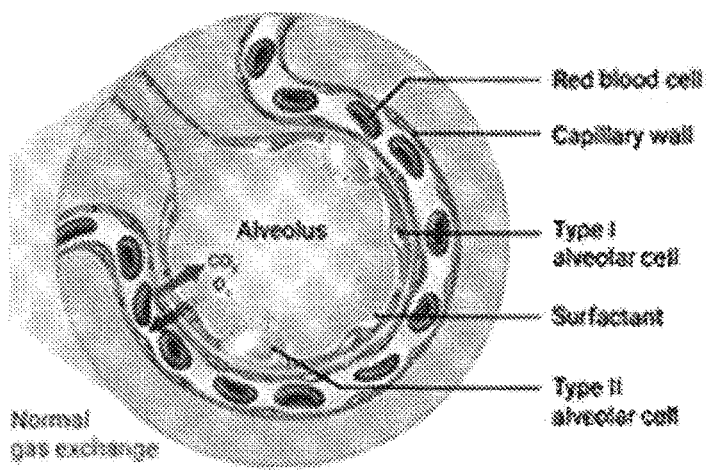
FIG. 3A-C show various stages and mechanisms of how the covid-19 virus damages human tissue.
Figure 3B:
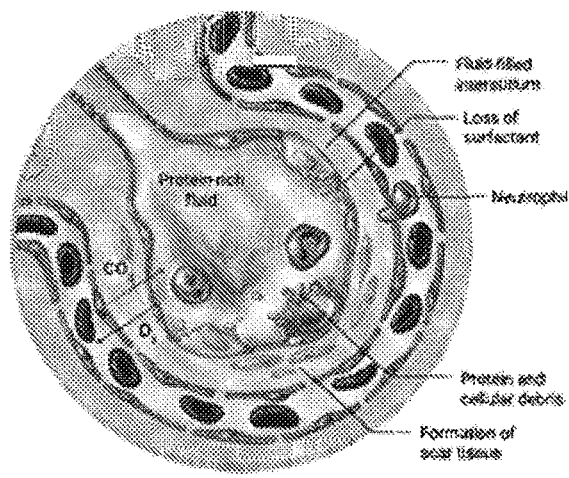
Figure 3C:
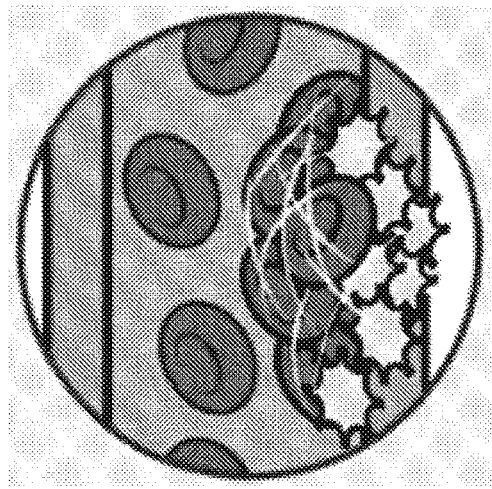
Figure 4:
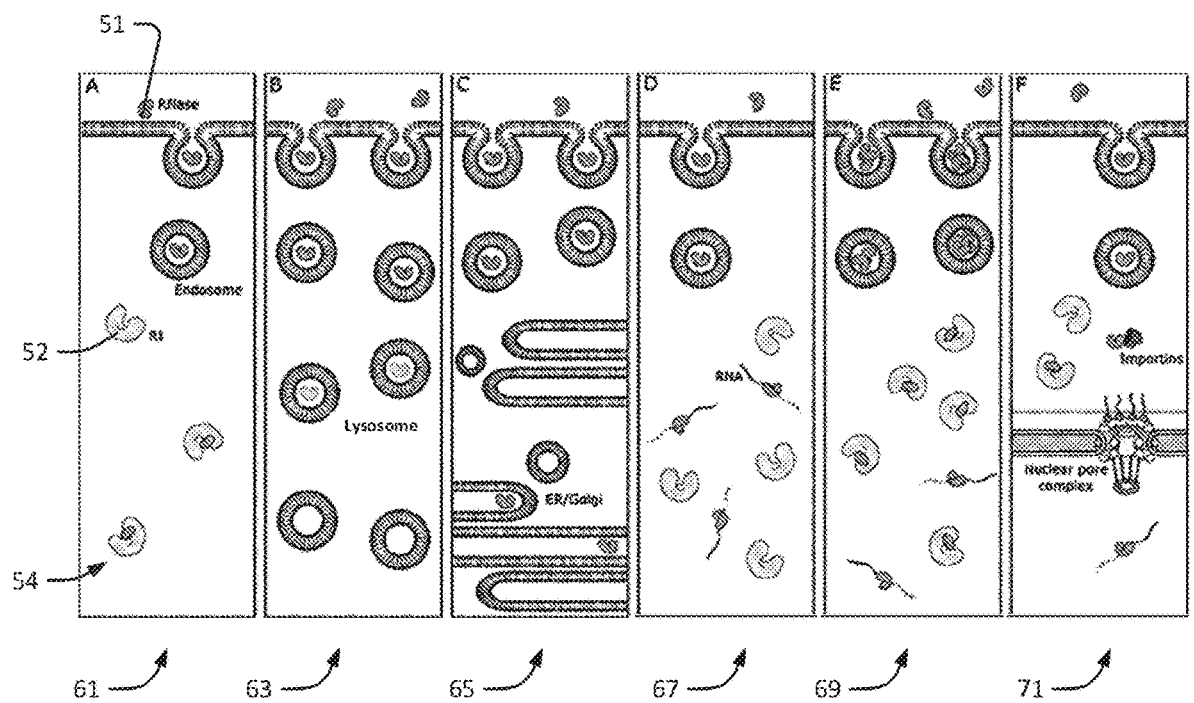
FIG. 4 is a diagram showing a number of exemplar factors which negatively impact the delivery effectiveness ([r]/[R]) of RNase.
Figure 5:
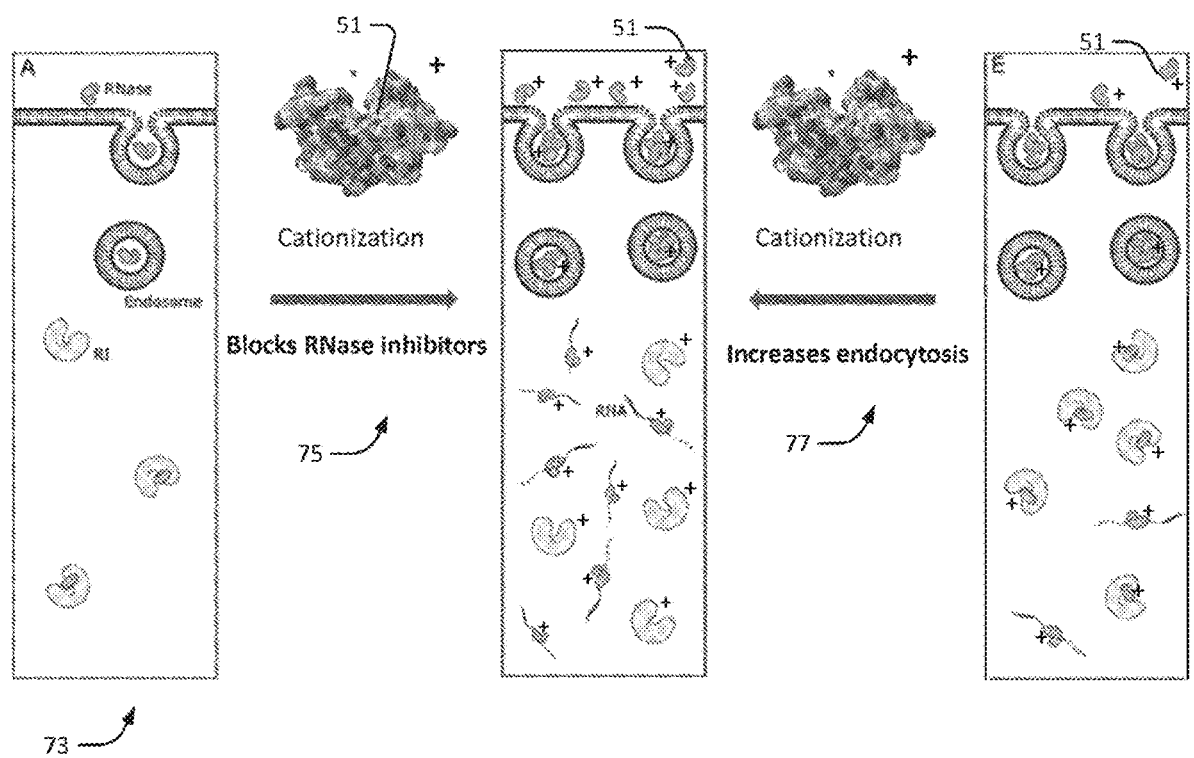
FIG. 5 is a diagram showing exemplar mechanisms by which cationized nucleases have improved effectiveness.
Figure 6:
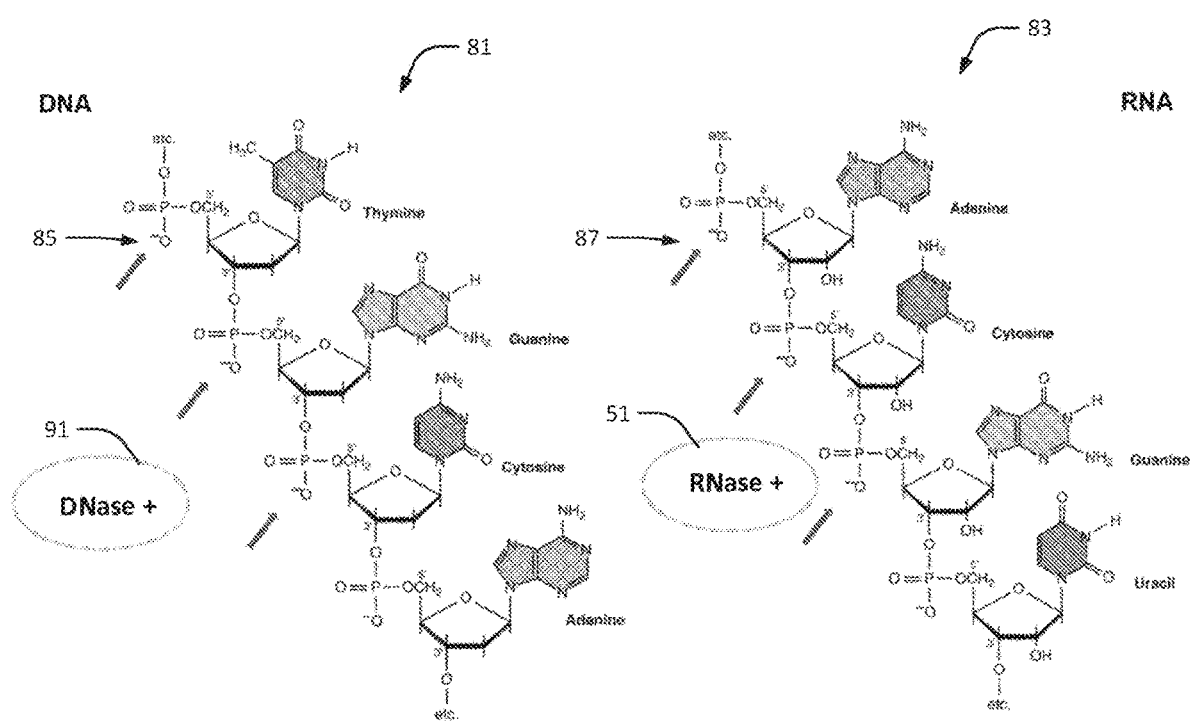
FIG. 6 is a diagram showing DNA and RNA bases with their inherent negative charge electro-chemical affiliation for positively charged respective nuclease compounds.
Figure 7:
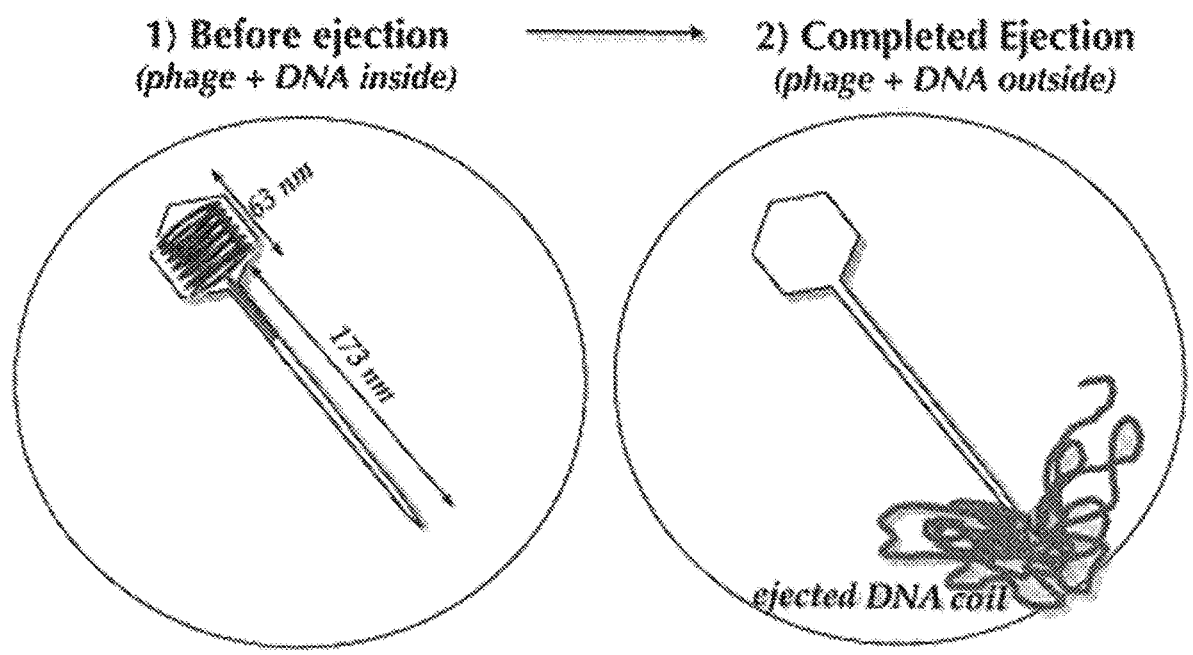
FIG. 7. is a diagram showing the process of ejection of nucleic material from a bacteriophage.
Figure 8A:
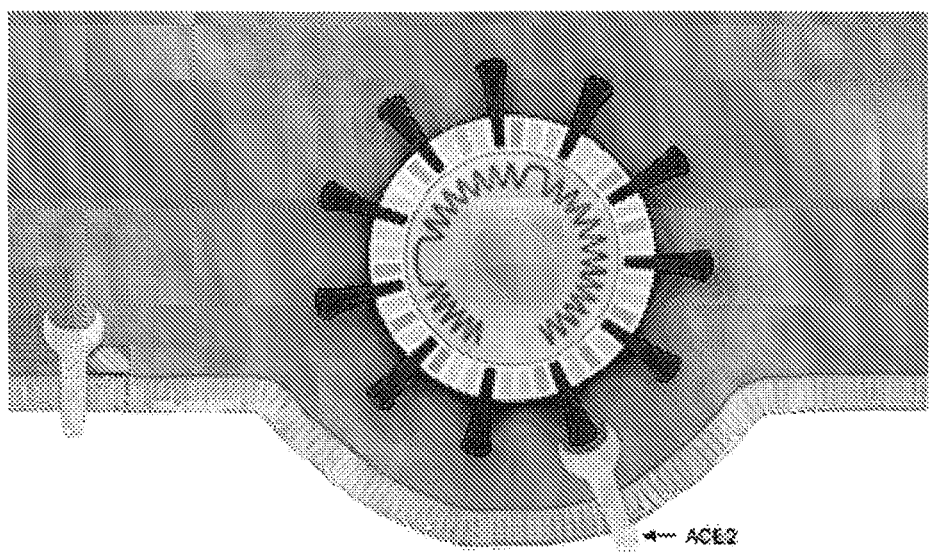
FIG. 8A-B is a diagram showing the analogous process for the ejection of nucleic material from a virus during endocytosis.
Figure 8B:
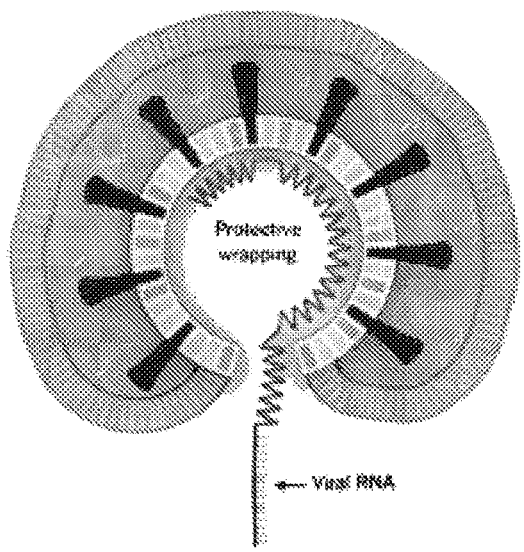
Figure 9:
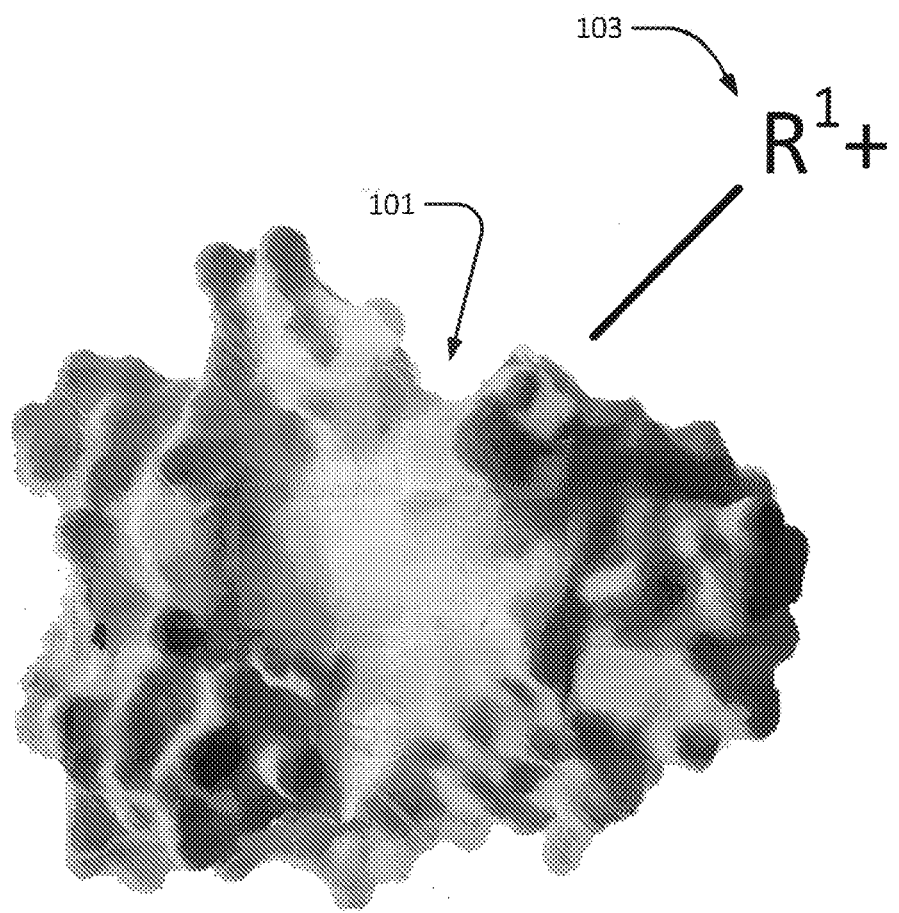
FIG. 9 shows a GRASP model of an exemplar nuclease with the shown inherent cationic "stripe" and superimposed in the diagram with the disclosed cationization group.
Figure 10:
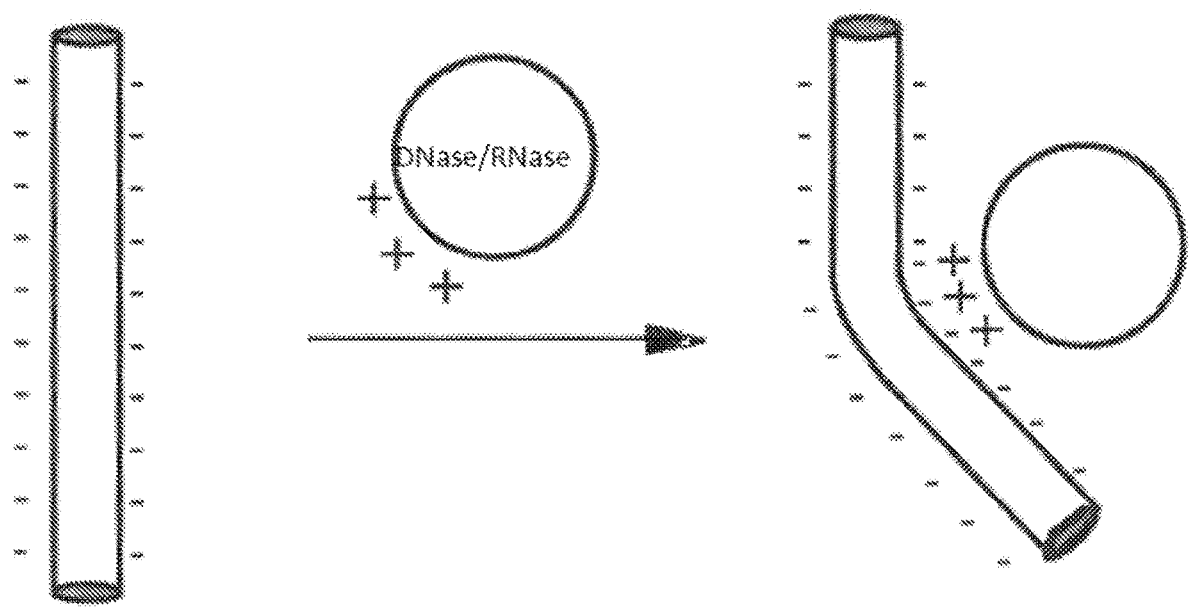
FIG. 10 shows diagrammatically an exemplar mechanism for the enhanced interaction between viral nucleic material and a disclosed cationized nuclease.
Figure 11:
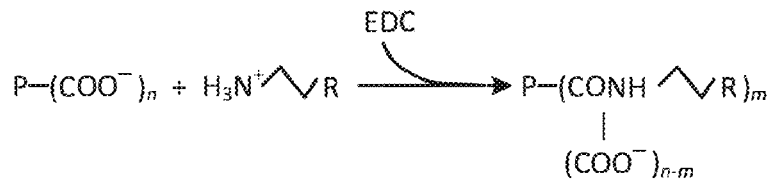
FIG. 11 shows an exemplar chemical reaction process for the cationization of selected nucleases.

Although nuclease effectiveness as an antiviral has been previously shown experimentally to be an effective antiviral therapeutic and cationized nucleases have been previously shown experimentally to be effective as an anti-cancer therapeutic, the effectiveness of cationized nucleases as an antiviral is an unexpected result or solution, particularly as directed to the treatment of coronavirus contagions such as the covid-19 virus. In previous work, limited effectiveness of a nuclease was experimentally shown for canines against a paramyxovirus and parvovirus and for certain respiratory diseases in human patients. Nevertheless, factors indicated for a coronavirus indicate unexpected complexities for treatment as shown in FIG. 3A-C. FIG. 3A shows an exemplar healthy mammalian alveolus, with normal gas exchange. FIG. 3B shows several exemplar deleterious effects of a coronavirus infection including lung injury—damage to epithelial cells; fluid accumulation in the lungs; blood clotting by increased coagulation within the small vessels of the lungs. Certain disclosed here therapeutic formulations of cationized nucleases provide effective treatment or prophylaxis against covid-19 by stopping or slowing virus replication by degrading viral RNA; similar to natural, original DNase, cationized DNase I for reduction of viscoelasticity of the fluid and, similar to natural DNase, cationized DNases for the prevention of clots formed by neutrophil extracellular traps, as shown in FIG. 3C. Effectiveness of various herein disclosed cationized formulations of nucleases exhibit significantly increased effectiveness as a therapeutic over known experimental results, which were for example limited to animal models (mice) suffering from lymphatic leukemia.

One mechanism of therapeutic effectiveness of the disclosed formulations of cationized nucleases is asserted as an improved ability to enter the cell to evade RNase inhibitors by this cationization over previously known nuclease mechanisms.

Effectiveness is established experimentally by in vivo and in vitro testing. In vitro (cellular models) are performed using human embryonic kidney cells (HEK293T) to demonstrate the therapeutic formulations of cationized DNase and RNase for reducing coronavirus OC43 replication, thereby providing preliminary analogous effectiveness for coronavirus covid-19. In vivo testing is performed upon black mice B6, infected with a coronavirus OC43 to demonstrate the therapeutic formulations of cationized DNase and RNase for reducing coronavirus OC43 replication. In vitro and in vivo testing with the above cellular and animal models confirms the unexpected substantially improved effectiveness of the optimally cationized nuclease formulations when compared to the same experiments performed with unmodified nuclease formulations or with highly cationized nucleases.

FIG. 4 details several exemplar mechanisms which inhibit or negatively impact the effectiveness of an RNase intended as an anti-viral agent. The first portion 61 (A) of the diagram shows how a RNase inhibitor (RI) 52 binds with the RNase to form an inert complex 54—the RNase is unable to evade the inhibitor. The second portion 63 (B) shows how an RNase may degrade during endocytosis, never reaching the cytosol. The third mechanism 65 (C) shows how the RNase may take an intracellular path which never reaches the cytosol. Other mechanism may otherwise impact the uptake or effectiveness of the RNase. In the fourth mechanism shown 67 (D), the efficiency of the RNase allows for it to evade the RI and effectively disrupt viral RNA replication. In the fifth mechanism 69 (E) shown, the concentration of RNase exceeds the saturation point of the RNase inhibitor allowing a quantity of RNase to disrupt viral replication. In the sixth mechanism 71 (F) shown, RNase can reach the interior of the cell nucleus, avoiding the RNase inhibitor. The latter mechanism is not helpful for enhancing effectiveness of RNase directed to viral replication disruption other than by disrupting the host cell. Improved and safe mechanisms for improving intracellular uptake and effectiveness of nucleases are needed to mitigate the first three mechanisms.

In alternative embodiments, strategies are considered in two groups: those allowing the cationized RNase to avoid the inhibition by the RNase inhibitor (FIG. 5, 75) and those that improve the delivery of the cationized RNase into the cell (FIG. 5, 77). Various embodiments of disclosed nuclease formulations function with both mechanisms. Embodiment mechanisms that avoid inhibition by an RNase inhibitor include: encapsulation, immuno-RNase and other ligand fusions, RNase gene therapy, PEGylation and albumin binding, and cationization. Embodiment mechanisms that improve the delivery of the RNase into the cell include: dimerization, the introduction of RI-RNase hindrance and modification of the intracellular pathway.

In various embodiments, cationized RNase A is the preferred nuclease therapeutic, chosen according to the results of experiments and assay disclosed herein. Among alternative embodiment nucleases, a disclosed therapeutic is cationized ranpiRNase or onconase (ONC), a modified formulation of a ribonuclease enzyme found in the oocytes of the northern leopard frog (rana pipiens). RanpiRNase is a member of the pancreatic ribonuclease (RNase A) protein superfamily and known to degrade RNA substrates. In published research, ranpiRNase has shown antiviral activity against HIV. In studies which compared ranpiRNase's antiviral effects on HIV with RNase I, RNase I had no antiviral effect on HIV.

In embodiments utilizing cationized ranpiRNase, antiviral effectiveness will be further enhanced by the capability of ranpiRNase to attach to the surface of the infected cell wherein the cationized ranpiRNase is able to efficiently target the anionic viral genome inside the cell by way of electrochemical interaction.

Some RNases have reached clinical trials for treatment of cancers, however the mechanism of action remains unclear. RanpiRNase is a ribonuclease enzyme found in the oocytes of the northern leopard frog (Rana pipiens). RanpiRNase is a member of the pancreatic ribonuclease (RNase A) protein superfamily. Based on the published phase one clinical study, the maximum tolerated dose (MTD) was 960 $\mu g/m^2$ of skin area.

FIG. 6 demonstratively shows by diagram the anionic nature of DNA 81 and RNA 83 strand bases 85 87 and the respective cationized nuclease 91 51 therapeutic, which interact with enhanced efficiency with viral nucleic acids' bases by electro-chemical affinity.

FIG. 7 and FIGS. 8A-B demonstrate the analogous processes of phage DNA ejection and viral DNA/RNA ejection during replication which both have anionic (negative) electro-chemical character. As explained above, the anion character of the nucleic material is one mechanism for the disclosed therapeutic cationic nuclease formulations, which increases interaction efficiency by way of electro-chemical affinity.

The nuclease shown in the GRASP diagram of FIG. 9 shows the inherent positively charged "stripe" portion 101 of a nuclease, which in the present disclosure is further enhanced for therapeutic efficiency by the cationization of the nuclease, shown here by the addition of the $R^1$+ group 103.

FIG. 10 shows another diagrammatic representation of the disclosed mechanism for the enhanced interaction between the cationized nuclease(s) and viral RNA or DNA by electro-chemical affinity.

FIG. 11 provides a range of reaction processes for exemplar cationization of several identified nucleases with alternative cationizing R functional groups in the presence of alternative concentrations of 1-Ethyl-3-[3-(diniethylarnmo) propyl]carbodiimide hydrochloride (EDC). As shown, the cationization may be for DNase or RNase nucleases, among them RNase A, e.g. ranpiRNase, onconase, as well as cSBL (sialic acid binding lectin from bullfrog Rana catesbeiana oocyte), and jSBL (sialic acid binding lectin from Japanese frog oocyte); RNase I (n=13); HEL (n=10); RNase T, T1, T2 (n=v, w, x); DNase I (n=y); DNase A (n=z). In FIG. 14 and above, n indicates the number of available cation binding sites (carboxyl groups, in the case of RNase A) for identified nucleases and v, w, x, y and z indicate the specific number of available cation binding sites for the named nuclease. Further, on the right side of this equation, m indicates the number of sites actually cationized by the reaction.

Figures 14, 15:
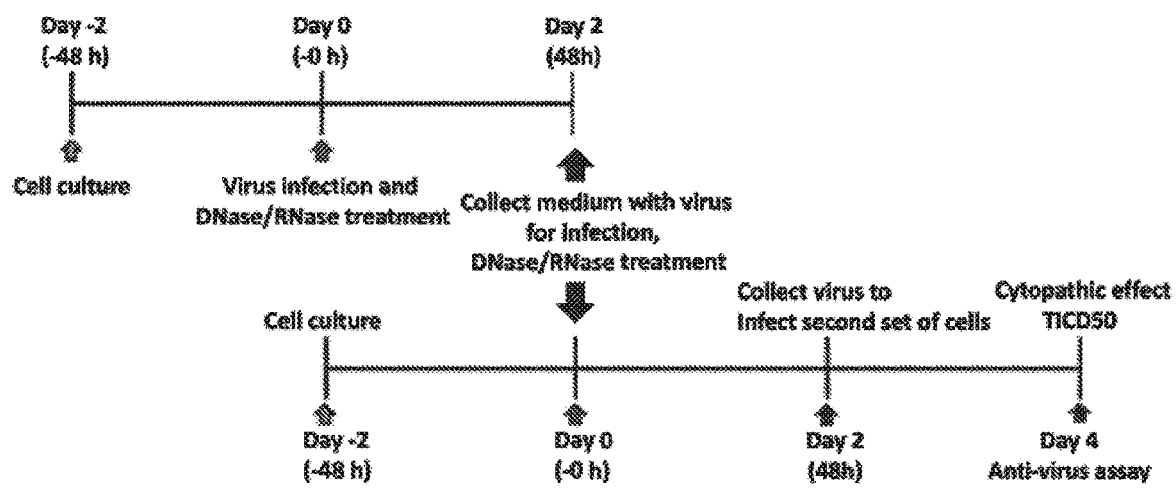
FIG. 14 shows the experimental groups for cationized nucleases.
FIG. 15 shows the time course assay for an alternative experimental protocol.

In various selected method embodiments, a version of a published protocol for testing the disclosed composition is utilized to determine therapeutically suitable nuclease formulations and compositions directed to the presently targeted disease family, coronavirus or in particular covid-19. In such an exemplar protocol, confluent 3T3-SV-40 cells are incubated with cationized and non-cationized RITC-labeled RNase A (see FIG. 14) for 120 min at 37° C., and the cells are examined under a confocal microscopy. In an assay embodiment, the tested versions of non-cationized nucleases are: VRITC-labeled RNase A and the tested version of cationized nucleases are: RNase A-$SO_3^-$, RNaseA-OH, and RNaseA-$NH_3^+$. Note that RITC-labeled RNase is utilized as its red-fluorescence is useful as a metric of activation. In various embodiments, alternative R groups or compounds with available R groups are selected from chemically operative alternatives, for instance by reacting with glycine methylester ($C_3H_7NO_2$).

In alternative embodiments, the therapeutic composition is a combination of non-cationized nucleases and/or cationized nucleases, which may as described above and below, operate as antiviral therapeutics by differing mechanisms.

Increased ionization or cationization of a nuclease has been identified to reduce enzymatic efficiency at high ionization levels. Conversely, increased ionization levels of a nuclease has been identified to increase cellular endocytosis of the nuclease. In various embodiments, therapeutic dosages are determined by optimizing the concentration of positively charged or cationized nucleases, which alternatively facilitate endocytosis or facilitate disruptive enzymatic activity directed to the target virus in infected cells.

In alternative embodiments, the nuclease DNase I, which has been identified to reduce intracellular viscoelasticity in the literature, is utilized in a combination therapeutic composition to mitigate excessive alveolar fluid viscosity in the fluid-filled interstitium, shown in FIG. 3B. Such a therapeutic mechanism is an unexpected application suitable to particular pathogenic issues of the covid-19 coronavirus. In alternative embodiments, suitable compositions as described above are selected for other viral infections, such as seasonal influenza.

Figure 16:
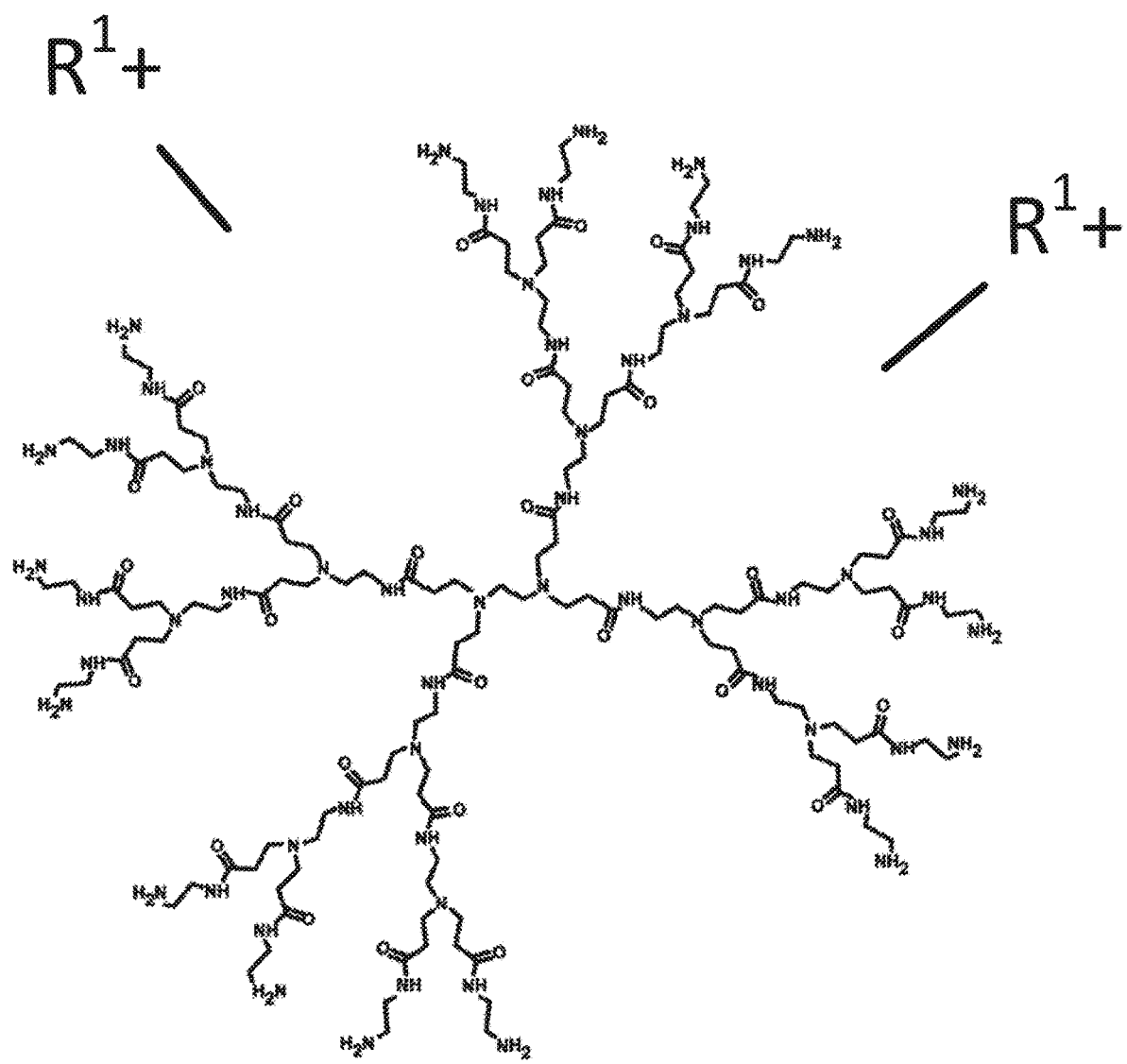
FIG. 16 shows the chemical structure of a polyamidoamine (PAMAM) dendrimer.

In various embodiments, RNase and DNase elements of the therapeutic enzyme composition are modified to increase delivery effectiveness (defined as [r]/[R] and described below) and antiviral efficacy by cotreatment, or mixing the respective nuclease with a highly cationic (net molecular charge Z=+16 to +30) dendrimer poly (amidoamine) (PAMAM) of different sizes/generations. The chemical structure of a generation 2 PAMAM dendrimer is shown in FIG. 16. Alternative embodiments utilize generation 0 to generation 10 PAMAM dendrimers. This mechanism works in synergy with covalent cationization to facilitate transport of the enzyme composition into the cytosol of virus infected cells.

In the disclosed embodiment, which differentiates from known mechanisms, the synergy between both transport mechanisms is utilized without the exclusion of one or the other. The synergy may be due to the remaining high-cationicity after enhanced translocation into the cytosol, thus being strongly attracted to the viral genome inside the infected cell. Thus the diminished catalytic activity due to the covalent cationization does not affect the resulting anti-viral activity inside the cell.

In alternative embodiments, enhancement of a mutated-cationic or cationized RNase efficacy is achieved by cotreatment with cationic dendrimer. Cancer treatment research has shown that cationization may reduce enzymatic activity, while merely higher doses may tend to kill all cells. Yet in antiviral applications, counterintuitively, it operates according to the following reasons. When augmented RNase/DNase enters cells more easily, they are able to attack the virus RNA, and also attack native cell RNA, shown in published cancer treatment research to cause high overall cellular toxicity). However, in the presently disclosed embodiments, the RNA of healthy (and cancer) cells are regulated: both in space, being in certain locations of the cell; and in time, being only exposed at certain functional periods of cell-life. In contrast, virus RNA is not regulated to the same locations or timing: it invades and releases its own RNA, to replicate. So, in antiviral applications, as opposed to antitumor, the cationization of RNase is optimized to intercept and degrade the virus-RNA rapidly and effectively without damaging the native host-cells. To provide such optimization, various embodiments provide for the increased levels of cationization net charge which reduces enzymatic activity, but improves endocytosis, transport and evasion of the RNase inhibitor (RI), and thus improve overall therapeutic effectiveness.

Figure 17:
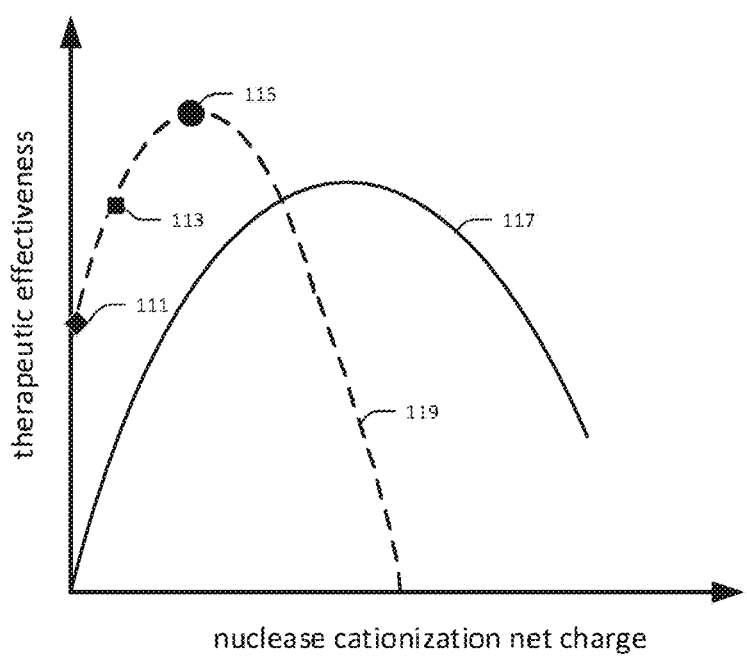
FIG. 17 shows a graph which demonstratively depicts the optimized effective cationization of an exemplar disclosed nuclease which balances the cationization charge effects on endocytosis and enzymatic efficiency of the nuclease as compared with previous published results.
Figures 18, 19:
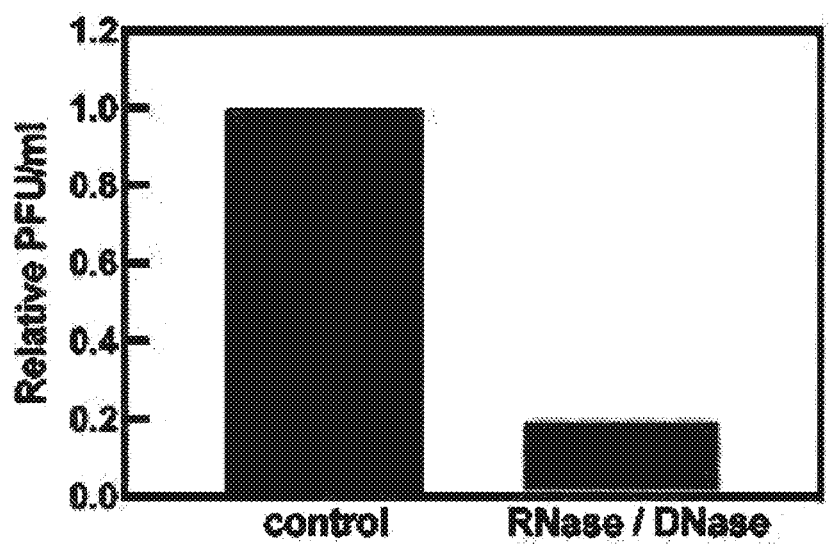
FIG. 18 shows a graph of experimental results demonstrating effectiveness of RNase/DNase vs. a control sample using the described protocol.
FIG. 19 shows the experimental groups for non-cationized nucleases complexed with dendrimers.

The optimization of net charge of the nuclease by cationization of the presently disclosed methodology and composition embodiments is differentiated from previously published work is shown in FIG. 17. The graph shown in FIG. 17 depicts this comparison according to the demonstrative characteristics of the previously published results. The x axis of the graph shows the net charge of the cationized nuclease. The y axis of the graph shows predicted (based on the demonstrated characteristics which act as competing effects of endocytosis and enzymatic activity) therapeutic effectiveness of the compound. The effectiveness of the antiviral use of a ribonuclease (RNase A) 111 is compared to the effectiveness of onconase 113 to fight HIV. The solid line 117 depicts results of cationized nucleases in an anti-cancer treatment study. These data 111, 113 and 117 are derived from published research. Based upon the characteristics of the disclosed cationized nuclease compounds and intercellular and enzymatic mechanisms explained herein, the optimized effectiveness of the disclosed embodiment compositions is shown 115.

Exosomes are a class of cell-derived extracellular vesicles of endosomal origin and are typically 30-150 nm in diameter—the smallest type of extracellular vesicle. Enveloped by a lipid bilayer, exosomes are released into the extracellular environment containing a complex cargo of contents derived from the original cell, including proteins, lipids, and nucleic material. Exosomes are defined by how they are formed—through the fusion and exocytosis of multivesicular bodies into the extracellular space.

In various embodiments, exosome extracellular vesicles are isolated by ultracentrifugation to process the exosomes as suitable treatment composition carrier vesicles, namely, as carrier vesicles for the disclosed nucleases and cationized nucleases alone or in effective combinations. The following is exemplar for the ultracentrifugation process:
1. Plasma from blood or cell culture supernatant is centrifuged for 30 minutes at 11,000×g.
2. Supernatant is recovered and further centrifuged at 18,000×g for 30 minutes.
3. The supernatant is recovered and ultracentrifuge once more for 2 hours at 100,000×g.

4. The resultant pellet is recovered and washed in phosphate buffered saline (PBS) and centrifuge again for 2 hours at 100,000×g.
5. The final pellet is enriched by exosomes.

In various embodiments, exosomes which may be isolated by the above ultracentrifugation process are utilized as a carrier structure for the composition of a selected nuclease or combination of cationized/non-cationized nucleases, which exosome structures carry the nuclease(s) to cellular boundaries, facilitating the endocytosis or other mechanism for penetration of the nuclease or modified nuclease(s) to interior of the cell. In various embodiments, the application selected composition of nucleases is loaded into the exosome carriers according to techniques known in the art. In alternative embodiments, synthetic exosomes are used as the carrier structure instead of naturally occurring exosomes.

The loading of exosome (with nucleases or cationized nucleases) is achieved based on their physical behavior as vesicles, notably the ability to self-heal by capillary forces of surface tension, in a way similar to a soap bubble maintaining its integrity. The exosomes must be suspended in a solution of desired molecular component (nuclease) and exposed to a shock perturbation, typically electrical (electroporation) or possibly acoustic ultrasound causing cavitation-bubbles. The result of such mechano-electrical disturbance is disruption of the exosomes walls and opening of multiple apertures, windows, where the molecular species (nucleases) can rapidly enter by Brownian diffusion. Upon following closure of the temporary apertures by natural surface tension forces, the nucleases become entrapped in the now-sealed exosome body. In this form they can be carried into the cell through the process of endocytosis, when the exosome first fuses with the cellular membrane, buds into the cell interior, and opens to release or enters inside. Natural degradation of exosome inside the cell then releases the nucleases, thus delivering their therapeutic ability inside the cell. Overall, an exosome acts in a manner analogous to a Trojan horse, delivering soldiers inside the fortress-killing the enemy virus inside the infected cell.

In various therapeutic method embodiments, the cationized DNase and RNase components of the antiviral agent are administered together as a mixture so as to act synergistically in the inhibition of viral reproduction. Alternatively, the cationized DNase and cationized RNase components can be consecutively administered over a relatively short period of time so as to still allow synergistic activity of the two cationized nucleases. For example, instead of preparing and administering a single solution of cationized DNase and cationized RNase, a solution of cationized DNase can be prepared and a separate solution of cationized RNase can be prepared. Administration of one solution and then the other may provide the same antiviral effect as a mixture of both. Separate preparation of each nuclease component can be advantageous when different ratios of the nucleases are needed for different treatments.

The composition can be administered orally, such as with protective coatings, or it can be attached to carriers such as a water-soluble polymer and injected into the subject. Administration by injection can include, for example, intravenous, subcutaneous, intramuscular and intracutaneous injection. Other types of administration can include, for example, topical, inhalation or by implantation into a body site or cavity. When the cationized DNase and cationized RNase composition, or other nuclease with properties of both enzymes, is used topically to treat, for example, superficial, cutaneous and mucosa membrane viral infection, it can be formulated into a pharmaceutically acceptable composition such as a lotion, cream, solution, emulsion, salve, suppositoria and the like. Additionally, it can be provided for administration in pharmaceutically acceptable mouthwash formulations for treating or preventing oral viral infections.

The optimal effective dosage of formulations of cationized DNase and cationized RNase administered for treatment or prevention of animal virus infections will depend on the size and body weight of the subject. In certain exemplar embodiments, the preliminary dose delivered should be sufficient to obtain a systemic, local or topical concentration between about 1 to 5 Degradation Assay units per pound of body weight of each nuclease. The rate of delivery is selectively between 50 to 150 Degradation Assay units for a child of about 65 pounds for about 1 to 6 administrations, preferably about 3 to 6 administrations, more preferably about 3 to 4 administrations per day. Embodiments relevant to adult patients utilize a dosage regimen scaled according to patient body mass, condition and age. Certain embodiments utilize as preliminary regimens exemplar published dosages, such as ranpiRNase (onconase) as has been used in clinical trials as a single agent in patients with malignant mesothelioma; patients are administered 480 µg/m2 intravenously weekly; the maximum tolerated dose (MTD) being 960 mg/m2.

In alternate embodiments, the disclosed combinations of cationized nucleases may be administered for prophylaxis effects. When used as a prophylactic, the embodiment includes an administration regimen suitable to maintain a stable serum or tissue level of the composition(s) to disrupt arriving viral infections. In various embodiments, the composition may be administered by inhalation, including by such devices as jet nebulizers, more sophisticated ultrasonic nebulizers, and metered-dose inhalers using fluorocarbon propellants. In other embodiments, a suitable formulation of the composition is processed to a powder form, which is inhaled by a dry-powder inhaler (DPI). Disclosed cationized nuclease inhalation is identified as an embodiment suitable for covid-19, due to its known transmission by aerosol and droplet to mucosa membrane tissue on the respiratory system.

The amount and rate of administration is dependent on the specific activity and stability of the enzyme preparations and is well within the determination of one skilled in the art given the effective dose range above. For example, smaller amounts of enzymes from preparations with higher specific activities can be used than that required for preparations having a lower specific activity. Treatment with the effective dose range should be continued until clinical symptoms are relieved. If additional infections occur, then treatment should be resumed. Alternatively, continued treatment following the disappearance of clinical symptoms can be advantageously used as a preventive measure of reoccurrence.

Although the method of this invention is described in some instances with respect to cationized pancreatic DNase and RNase, practice of the principles of this invention is contemplated with antiviral agents which are equivalent to the above-mentioned nucleases in their properties to hydrolyze viral nucleic acids. The cationized DNases and cationized RNases are cationized after being isolated preferably from bovine or swine pancreas by methods well known in the art. Such methods include extraction of the enzymatic proteins from the minced pancreatic glands by a weak solution of sulfuric acid, stepwise precipitation of the enzymatic proteins by ammonium sulfate, purification of nucleases by chromatography and lyophilization of the enzymes. Alternatively, the nuclease components of the present invention can be produced by recombinant methods such as high-level expression in a prokaryotic expression system. Recombinant expression offers many advantages over classical biochemical purification of proteins and enzymes. For example, the nucleases can be efficiently produced in mass quantities due to the easy fermentation characteristics of bacteria and are more easily purified to homogeneity. DNase and RNase (pre-cationization) are also readily commercially available. Commercial preparations of bacterial endonucleases with properties of DNase and RNase (pre-cationization) are also available and may be processed to their disclosed cationic composition using the methodology described below.

In various embodiments, the base nuclease for the cationized and/or the non-cationized ribonuclease (RNase) is chosen from the group of: endoribonuclease and exoribonuclease.

In various embodiments, the base nuclease for the cationized and/or the non-cationized RNase is chosen from the group of: RNase I, RNase A, RNase H, RNase III, RNase L, RNase P, RNase PhyM, RNase T1, RNase T2, RNase U2, RNase V, RNase E, RNase G, PNPase, RNase PH, RNase R, RNase D, RNase T, Oligoribonuclease, Exoribonuclease I, Exoribonuclease II.

In various embodiments, the base nuclease for the cationized and/or the non-cationized deoxyribonuclease (DNase) is chosen from the group of: endodeoxyribonuclease and exodeoxyribonuclease.

In various embodiments, the base nuclease for the cationized and/or the non-cationized DNase is chosen from the group of: DNase I, DNase II, micrococcal nuclease, exonuclease III, mung bean nuclease, nuclease BAL 31, nuclease SI.

In various embodiments, the cationized nuclease is mixed and/or complexed with a dendrimer to utilize an exhibited Positive Dendrimer Effect which substantively increases the catalytic activity/effect of the cationized nuclease, resulting in virtual elimination of the target virus on high logarithmic scale. Results of in vitro experiments were confirmed by quantitative PCR testing, detailed below.

In various embodiments, the selected dendrimer is chosen through experimental optimization for particular anti-viral applications. Although in the experiments described herein the selected dendrimer was generation 2 PAMAM dendrimer, alternative embodiments utilize other dendrimers for an optimized positive dendrimer effect to catalyze the anti-viral action of RNase.

EXAMPLE I

In an exemplar experimental methodology confirmation of the efficacy of inhibitory effects of the presence of RNase and DNase on viral infection (HCoV-NL63/OC43), and thereby virus production or cytopathic effects are confirmed by the following exemplar logic and associated protocol.

As explained above, RNase and DNase nucleases act to disrupt viral nucleic acids of infected cells. The enzymes can enter the cells during viral membrane fusion, then act upon the nucleic acids after release from the virus. Cellular nucleic acids may be influenced but limited by cell response pathways and internal cellular structures, like the nucleus. This allows for a disproportionate disruption of viral nucleic acids that would not have such protections.

In this example, RNase A was used as the exemplar ribonuclease. The RNase A utilized was bovine pancreas ribonuclease A from bovine pancreas, catalog number Fisher EN0531, with antiviral activity of ≥100 Kunitz units/mg.

Method 1: Infect cells with a known concentration of virus (Day 0), observe cytopathic effect in treated and non-treated cells (about Day 4). This tests the direct inhibitory action on virus infection. Results are determined according to Tissue Culture Infectious Dose, a method used when verifying viral titer, which signifies the concentration at which 50% of the cells are infected when a test well plate with cultured cells is inoculated with a diluted viral solution. This is referred to as TCID50.

FIG. 12 depicts the time course assay of DNase and RNase affecting virus replication using HEK293T cells.

Bsc-1 or HEK293T cells are seeded in 96 well plate, $5\times10^4$ cells/well for two days (from day −2 to day 0) in Dulbecco's Modified Eagle Medium (DMEM) with 2% Fetal Bovine Serum (FBS), 100 U/mL of penicillin, and 100 mg/mL of streptomycin. and cultured at 37 C under a humidified atmosphere of 5% $CO_2$. OC43 virus infection on Day 0 with MOI 0.5, and then 0.25mg/ml DNase and 0.25 mg/ml RNase are added to cells, together with virus, for testing prevention and treatment capability. Two days after (Day 2) the virus infection and DNase-RNase treatment stage, the cell medium is collected from each well for RT-PCR to quantify the virus released from infected cells in the following 4 groups shown in FIG. 12. After the medium removal, the remaining cells are fixed and stained with anti-OC43 antibody in order to visualize viruses associated with the cells. Four days after the virus infection and DNase-RNase treatment stage (Day 4), cytopathic effects become apparent/visible, TCID50 is calculated for all 4 groups (shown in FIG. 13) or 6 groups for cationized DNase-RNase (shown in FIG. 14), following the Reed-Muench method. At each time point described above, microscopic images of cells are captured and recorded documenting cellular morphology changes.

FIG. 13 depicts the four experimental groups for non-cationized nucleases in an experimental embodiment: Group 1, no virus infection and no DNase-RNase treatment. Group 2, no virus infection, but with DNase RNase treatment. Group 3, with virus infection, but no DNase-RNase treatment. Group 4, with virus infection and DNase-RNase treatment.

FIG. 14 depicts the six experimental groups for cationized nucleases in another experimental embodiment: Group 1, no virus infection and no DNase-RNase treatment. Group 2, no virus infection, but with DNase-RNase treatment. Group 3, no virus infection, but with cationized DNase-RNase treatment. Group 4, with virus infection, but no DNase-RNase treatment. Group 5, with virus infection and DNase RNase treatment. Group 6, with virus infection and cationized DNase-RNase treatment.

Method 2: Infect cells in a 96 well plate with a known, high concentration of virus in different medias. Collect virus after 1 infection cycle. Titrate to a new plate to observe TCID50. This confirms the impact on virus replication and production.

FIG. 15 depicts the time course assay for method 2, of DNase and RNase affecting virus replication using HEK293T cells. In certain embodiments, method 2 utilizes the same experimental groups design as in method 1 modified by collecting the medium at Day 2 with a second generation virus to infect a second, fresh set of cells.

The protocols and methodologies described above are exemplar of protocols used to verify the therapeutic efficacy, dosages and regimens of disclosed compositions including single or multiple nucleases, single or multiple cationized nucleases, single or multiple cationized and non-cationized nucleases in combination and single or multiple cationized and/or non-cationized nucleases carried by exosome structures.

Figure 12:
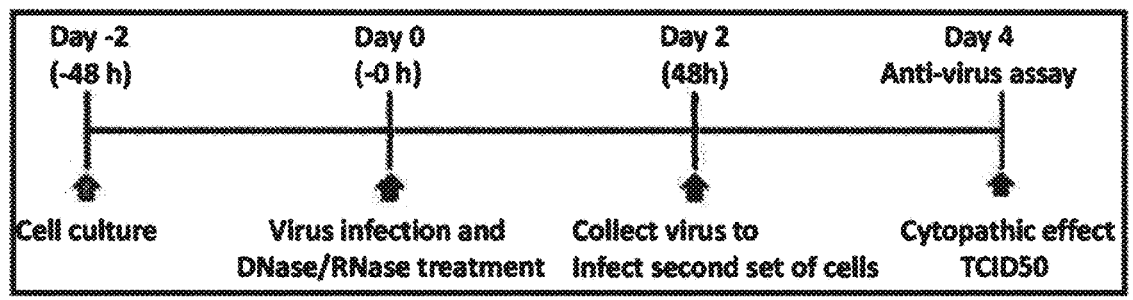
FIG. 12 shows the time course assay of DNase and RNase affecting virus replication using HEK293T cells.
Figure 13:
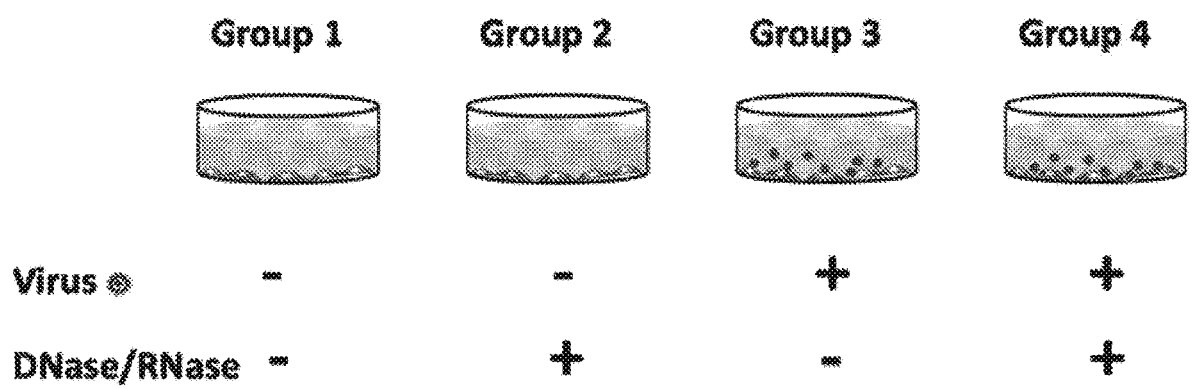
FIG. 13 shows the experimental groups for non-cationized nucleases.
Figures 20, 21:
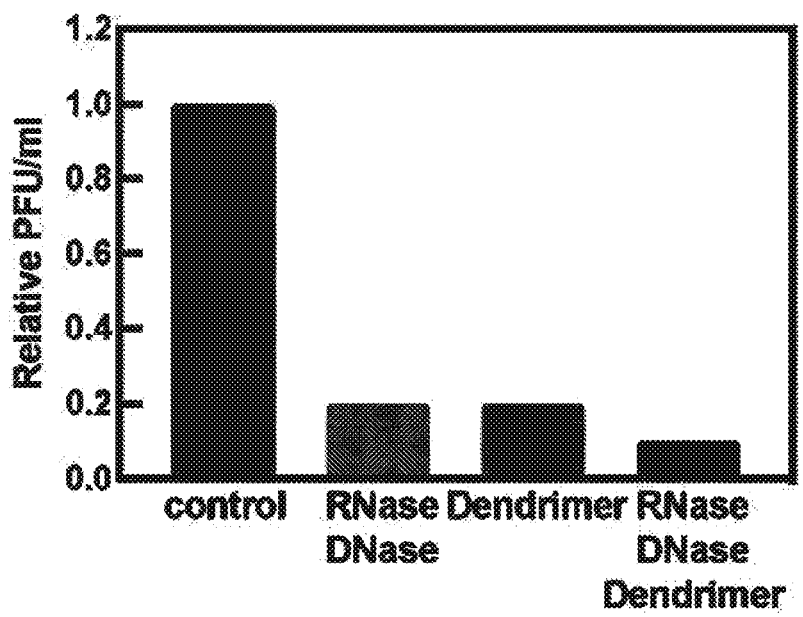
FIG. 20 shows a graph of experimental results demonstrating effectiveness of RNase/DNase and RNase/DNase complexed with dendrimers vs. a control sample using the described protocol.
FIG. 21 shows the experimental groups for low and high concentration cationized nucleases.

Experiments following the above protocol under method one (FIG. 12) were performed in US CDC Certified BSL2 Lab (Bio Safety Lab Level2). Results for the tests in FIG. 13 Groups 1-4 have demonstrated that the HCoV-OC43 virus, Betacoronavirus genus (the same genus as MERS-CoV, SARS-COV and SARS-COV-2) produced a clearly visible cytopathic effect on HEK293T type of cells. This allowed direct visual microscopic evaluation of the virus replication effect on cells by a standard TCID50 methodology. The DNase/RNase formulation tested was 50% Bovine pancreatic ribonuclease RNase A and 50% Bovine pancreatic deoxyribonuclease DNase 1.

These results of TCID50 show that non-cationized DNase-RNase reduced HCoV-OC43virus titer by approximately five times, from TCID50 of 1.58·105 to 7.34·105 rus. This demonstrates that DNase-RNase efficiently reduce virus replication by a factor of 4.65 (that is 0.7 logs) and 78.5% reduction in virus presence as compared to baseline HCoV-OC43 infected media. FIG. 18 shows a graph of these experimental results as the concentration of plaque forming units (PFU) for the experimental control group and the group treated with RNase/DNase.

Based upon these in vitro results for non-cationized DNase-RNase effects on viral activity and the above explanation for the basis of the disclosed composition enhancements by cationization and other disclosed enhancements such as by complexing the selected nuclease(s) with a specified dendrimer formulation as described above or by other disclosed enhancements.

EXAMPLE 2

A second exemplar experimental methodology confirms the effectiveness of a co-treatment of RNase/DNase complexed with highly cationic molecule dendrimer (the generation 2 poly PAMAM dendrimer) to enhance the efficacy of ribonucleases as anti-virus (HCoV-NL63/OC43) agents.

In this exemplar set of experiments, the same methodology, including the cellular compositions, viral samples, and RNase/DNase formulations from Example 1 are utilized in the various experimental combinations shown in FIG. 19. The experimental groups include formulations with the virus, RNase/DNase and the above mentioned 10 μM dendrimer.

Results of these experiments show a synergistic efficacy of the use of a dendrimer as the concentration of plaque forming units (PFU) for the experimental control group, the group treated with RNase/DNase, the dendrimer group and the dendrimer/nuclease group, which is shown in FIG. 23.

EXAMPLE 3

A third exemplar experimental methodology is used to confirm the effectiveness and safety of highly cationized and mildly cationized RNase to enhance the efficacy of ribonucleases as anti-virus (HCoV-NL63/OC43) agents.

Mixtures of cationized RNase were manufactured according to previously published methods and were divided into aggregate mixtures with an average net charge of the mixture deemed "mildly", "mild or "low" charged or cationic RNase and a second mixture with a net charge deemed "highly" or "high" charged or cationic RNase.

Initially, the cationization process began with a exemplar RNase A, bovine pancreas ribonuclease A Type XII-A, catalog number Sigma R5500 with antiviral activity of 75-125 Kunitz units.

To manufacture RNase mixtures of varying cationization net charge, the following process was utilized. The carboxyl groups of bovine pancreatic RNase A (the number of carboxyl groups, n=11) were amidated with ethylenediamine to convert negative charges of the carboxylate anions to positive charges by a carbodiimide reaction. Two reaction conditions varied in the amount of EDC used and the combined products were mixtures of diversely modified proteins. The mixture of cationized RNase identified as and defined herein as "mildly" or "low" cationized RNase is manufactured according to the first reaction conditions. The mixture of cationized RNase identified as and defined herein as "highly" or "high" cationized RNase is manufactured according to the second reaction conditions. The "cationized" is referred to as the "coupling reaction" as it couples or conjugates the utilized cationizing agent to couple or conjugate with the available carboxyl groups of the RNase. As described below, the coupling reaction between the RNase and the cationizing agent may be used with a single cationizing agent to obtain differing levels of aggregate cationization (changes in overall net charge) by the concentration and timing of the use of what is referred to herein as a cationizing catalyst to initiate the coupling reaction. In various embodiments, alternative cationizing agents and cationizing catalysts may be used, some of which are described herein. Examples of alternative cationizing agents suitable for coupling or conjugation to available carboxyl groups of RNase include in addition to ethylenediamine used in this example, 2-aminoethanol and taurine.

In the exemplar embodiments described in this and the next examples (Examples 3 and 4), the coupling reaction was carried out under two different conditions to obtain mildly and highly cationized RNase A. Two solutions were prepared by dissolving 50 mg of RNase A in a 5 ml solution of the cationizing agent 2 M ethylenediamine dihydrochloride-NaOH, pH 5.0. The coupling reactions were initiated by adding 10 mg of the cationizing catalyst, EDC to the first solution with stirring at room temperature, leading to mildly or low-level cationization To prepare a highly cationized RNase A, 80 mg of EDC was added to the second solution, then 80 mg of EDC was added at 3 h, and 40 mg at 18 h. All reaction mixtures were stirred continuously at room temperature for 21 h, then dialyzed against distilled water at 4'C.

To determine the resulting aggregate net charge of each mixture (mildly or highly) cationized RNase A may be fractionated according to net charge by cation-exchange chromatography. Based upon calculated estimates from published data, the aggregate net charge of the mildly cationized RNase obtained from the above methodology is approximately +11 to +13 and the aggregate net charge of the highly cationized RNase obtained from the above methodology is approximately +21 to +23.

In this example, initially, the cytotoxicity of cationized RNase using HEK293T cells is tested. Next, the highest dose with more than 80% surviving cells is selected for an anti-viral test of a co-treatment of RNase/DNase complexed with a highly cationic molecule dendrimer (the generation 2 poly PAMAM dendrimer described above) to enhance the efficacy of ribonucleases as anti-virus (HCoV-NL63/OC43) agents.

In this set of exemplar experiments, the same methodology, including the cellular compositions, viral samples, and RNase/DNase formulations from Example 1 are utilized in the various experimental combinations shown in FIG. 21.

Figure 22:
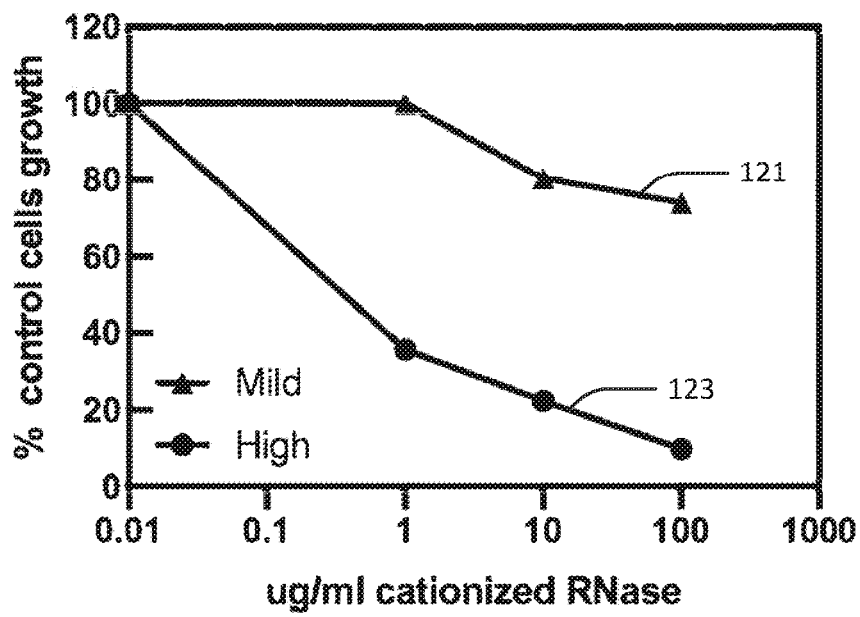
FIG. 22 shows a graph of experimental results demonstrating effectiveness of various concentrations of cationized RNase using the described protocol.
Figure 23:
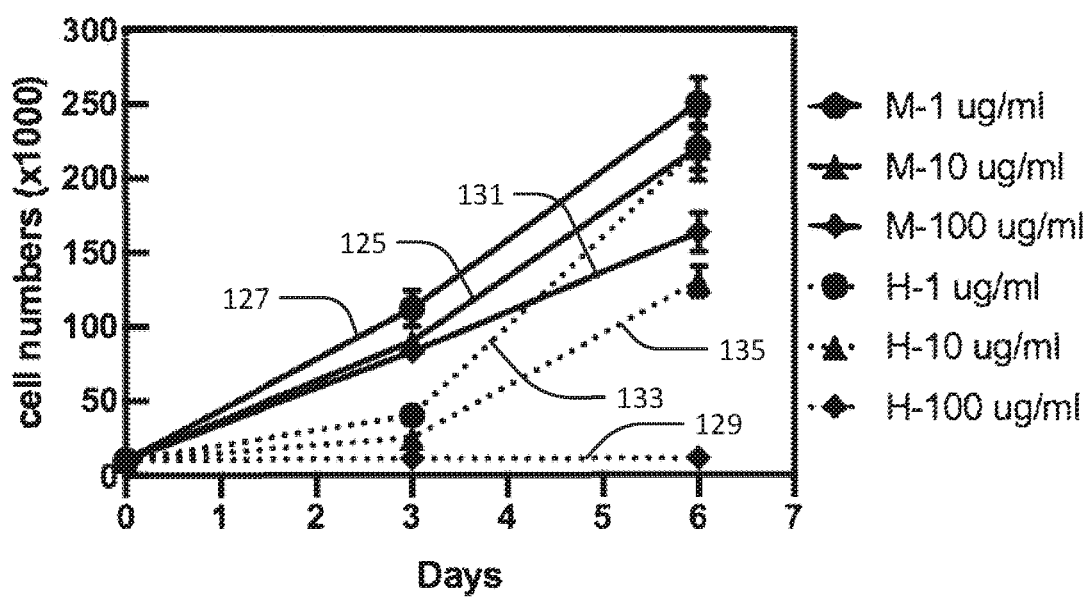
FIG. 23 shows a graph of experimental results demonstrating effectiveness over time of various concentrations of cationized RNase using the described protocol.

Results of these experiments, shown in FIG. 22 demonstrate the survival of 80% of the control cells for concentrations of 10 ug/ml for mildly-cationized RNase. Interpolation of experimental results for highly-cationized RNase estimate the 80% survival of control cells at concentration levels of 0.2-0.5 µg/ml. The growth over time for these individual experimental results is shown in FIG. 23. For mildly-cationized RNase, concentrations of 1 µg/ml 125, 10 µg/ml 127 and 100 µg/ml 131 are shown over an elapsed period of 6 days. For highly-cationized RNase, concentrations of 1 µg/ml 133, 10 µg/ml 135 and 100 µg/ml 129 are also shown over an elapsed period of 6 days.

Figure 24:
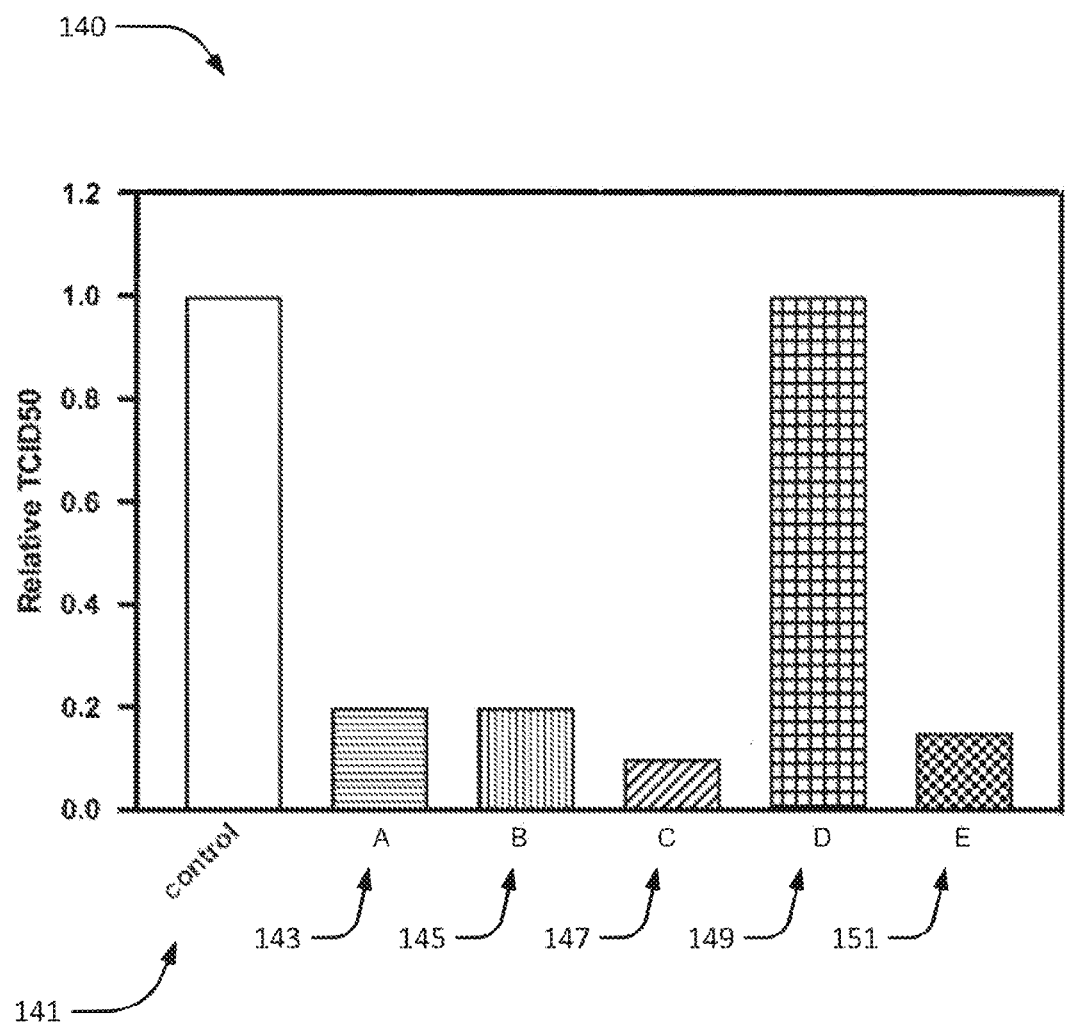
FIG. 24 shows a bar chart of experimental results showing the comparative effectiveness of RNase/DNase and dendrimer formulations using the described protocol.

FIG. 24 shows the comparative results of the tested formulations for effectiveness to reduce the OC43 virus using HEK293T cells. The chart includes TCID50 results for the control group 141, the above described formulation of RNase and DNase 143, generation 2 poly PAMAM dendrimer 145, the combination of RNase and DNase complexed to gen 2 poly PAMAM dendrimer 147, the above described formulation of highly cationized RNase 149, and the above described formulation of mildly-cationized RNase 151. Experimental results showed the effective reduction compared to the control group to be 4.8× for the 250 µg/ml formulation of RNase and DNase 143. Experimental results showed the effective reduction compared to the control group to be 4.8× for the 250 µg/ml formulation of RNase and DNase 143. Experimental results showed the effective reduction compared to the control group to be 4.8× for the 10 µM formulation of generation 2 poly PAMAM dendrimer 145. Experimental results showed the effective reduction compared to the control group to be 10× for the combination of 250 µg/ml RNase, DNase and 10 µM gen 2 poly PAMAM dendrimer 147. Experimental results showed the effective reduction compared to the control group to be negligible for the highly cationized formulation of RNase 149. Experimental results showed the effective reduction compared to the control group to be 6.8× for the mildly cationized 7.5 µg/ml formulation of RNase 151. The above described results show unexpected anti-viral effectiveness for novel formulations of RNase/DNAse, a combination of RNase/DNase mixed/and or complexed with a selected dendrimer, and a mildly cationized RNase.

EXAMPLE 4

A fourth exemplar experimental methodology is used to confirm the effectiveness and safety of mildly cationized RNase and a combination formulation of mildly cationized RNase with the disclosed exemplar PAMAM dendrimer to enhance the efficacy of a ribonuclease/dedrimer combination as anti-virus (HCoV-NL63/OC43) agents. Given the unexpected high level of effectiveness of the combination, RT-qPCR testing was conducted to measure viral load following the treatment protocol.

Figures 25, 26:
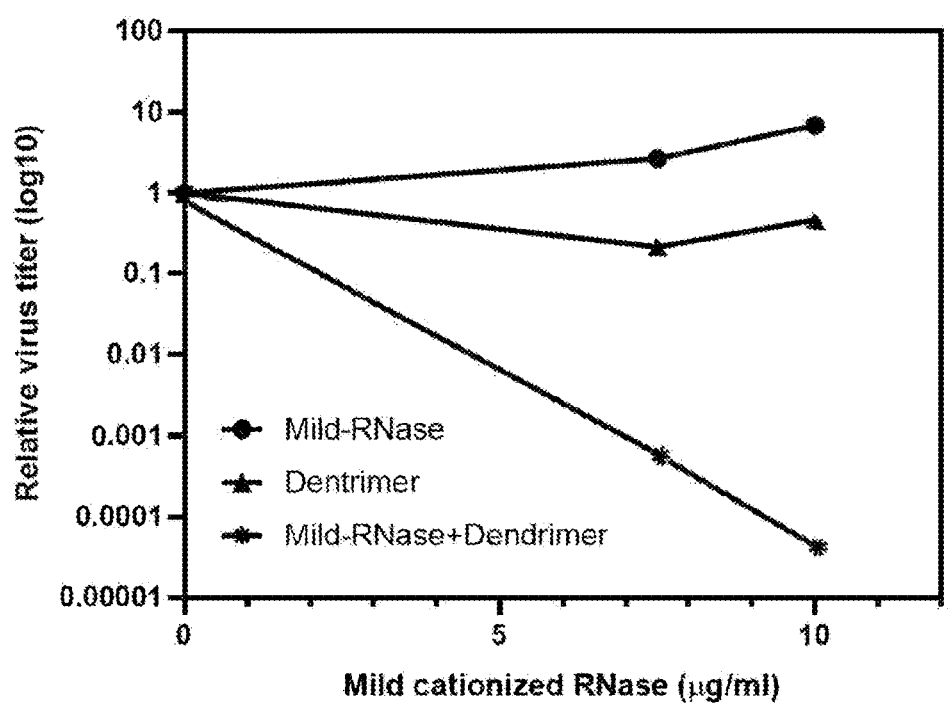
FIG. 25 shows the experimental groups for cationized nuclease-dendrimer formulations.
FIG. 26 shows a graph of experimental results demonstrating effectiveness of various concentrations of mildly cationized RNase, dendrimer and a formulation of the two using the described protocol.

FIG. 25 shows the various control and nuclease/dendrimer formulations tested for effectiveness against the tested virus. In this set of exemplar experiments, the same methodology, including the cellular compositions and viral samples, mildly cationized RNase and gen 2 PAMA dendrimer from Example 3 are utilized in the various experimental combinations shown in FIG. 22.

Test results show that a formulation of 10 ug/ml mild-cationized RNase combined with 10uM dendrimer, reduced OC43 virus titer to negligible levels in vitro using HEK293T cells compared with a control cell group without treatment.

As can be seen from the graph, the results indicate a very strong synergistic effect of the mildly cationized RNase and PAMAM dedrimer. The unexpected very significant effectiveness of the anti-viral formulation was confirmed by highly sensitive RT-qPCR testing as detailed below.

To conduct the RT-qPCR testing, cell culture medium was collected at 3 and 5 days after virus infection with or without mild RNase plus dendrimer treatment for RT-qPCR test. RNA from the infection virus were used for reverse transcriptase (RT) to direct complimentary DNA (cDNA) synthesis. The resulting cDNA was used as templates for the RT-qPCR reaction with a SYBR RT-PCR Kit. Reaction conditions were: 30 minutes RT at 50° C., 15 minutes at 94° C. for inactivation of reverse transcriptase (RT), followed by 40 cycles of 95° C. for 15 seconds, 60° C. for 45 seconds. Finally, conditions of 65° C. for 5 seconds and 95° C. for 5 seconds were used.

Melting curve analysis was performed under the condition of 95° C. for 60 seconds, 40° C. for 60 seconds, 65° C. for 1 second, followed by a slow increase from 65° C. to 95° C. at a rate of 0.07° C. per second.

For the selected viruses identified, the following primers are used:

| | |
|---|---|
| OC43-F: | ATGTCAATACCCCGGCTGAC |
| OC43-R: | GGCTCTACTACGCGATCCTG |

Note that the limit for this PCR reaction is between 10-100 particles, which is sufficient to detect if a well is infected or has virus present.

Figure 27:
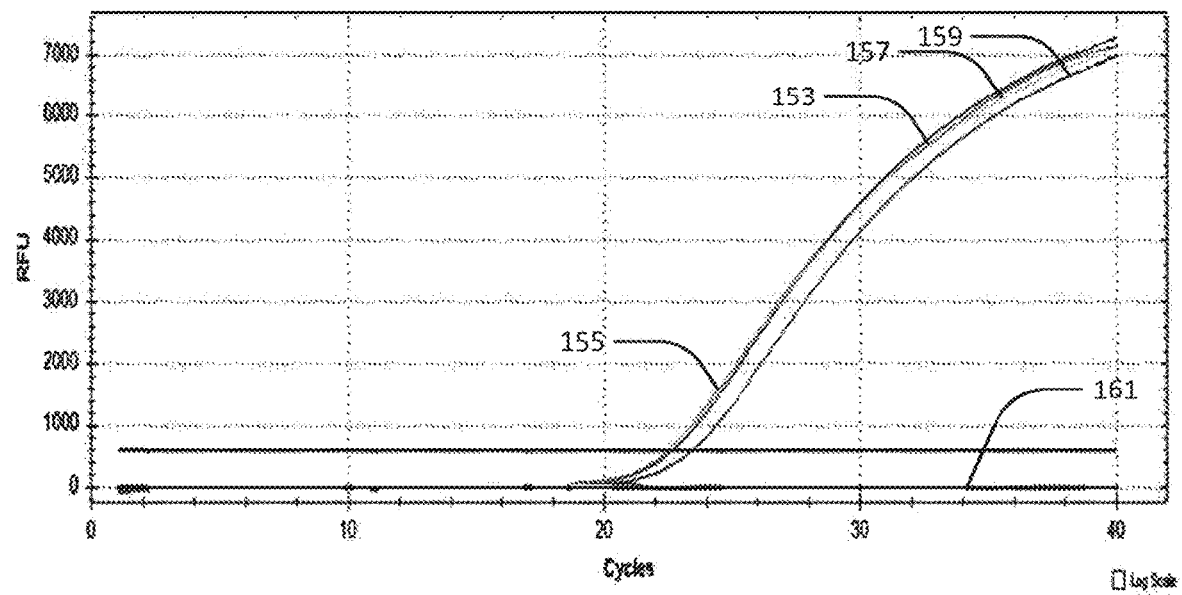
FIG. 27 shows the results of reverse transcriptase quantitative polymerase chain reaction (RT-qPCR) showing the effectiveness of the disclosed nuclease/dendrimer formulations after 3 days.

Results of the RT-qPCR testing after 3 days are shown in FIG. 27. The virus was undetectable in the medium after 3 days of treatment by the mildly cationized RNase/dendrimer formulation. The graph shows the reactive fluorescence units vs testing cycles the formulation and control viral concentrations. The qPCR virus detection results for the formulation of mildly cationized RNase (10 µg/mL) and gen 2 PAMAM dendrimer (10 µM) are shown as undetected 161; the mildly cationized RNase (10 µg/mL) treated only are shown as detected curves for viral loads of $10^{-6}$ 155, $10^{-5}$ 159, $10^{-4}$ 153, and $10^{-3}$ 157 time dilution, are shown.

Figure 28:
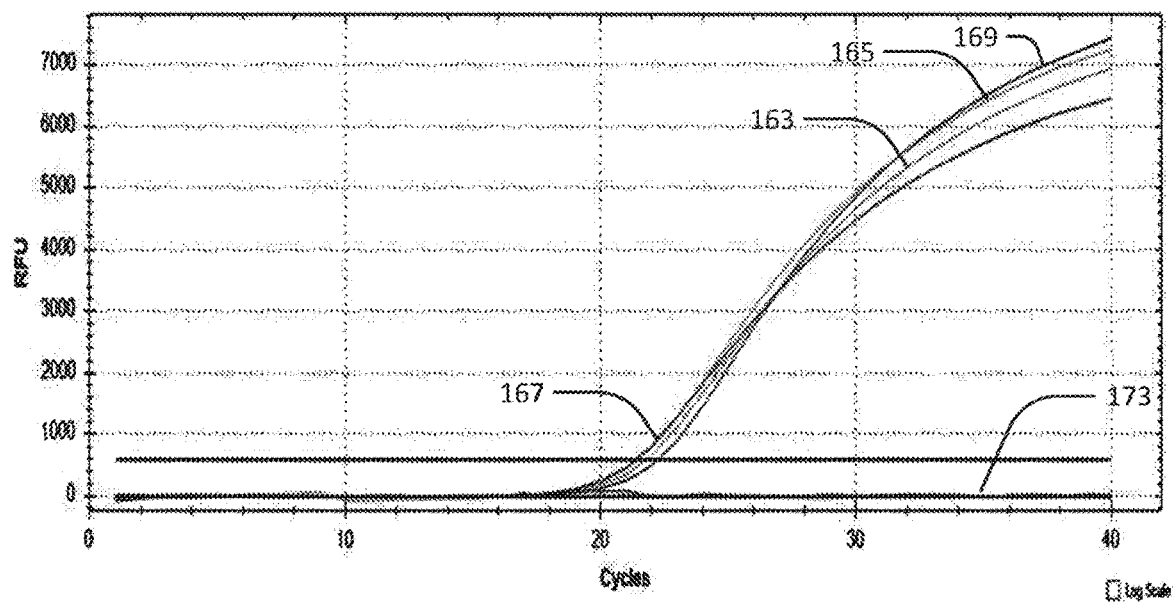
FIG. 28 shows the results of reverse transcriptase quantitative polymerase chain reaction (RT-qPCR) showing the effectiveness of the disclosed nuclease/dendrimer formulations after 5 days.
Figure 33:
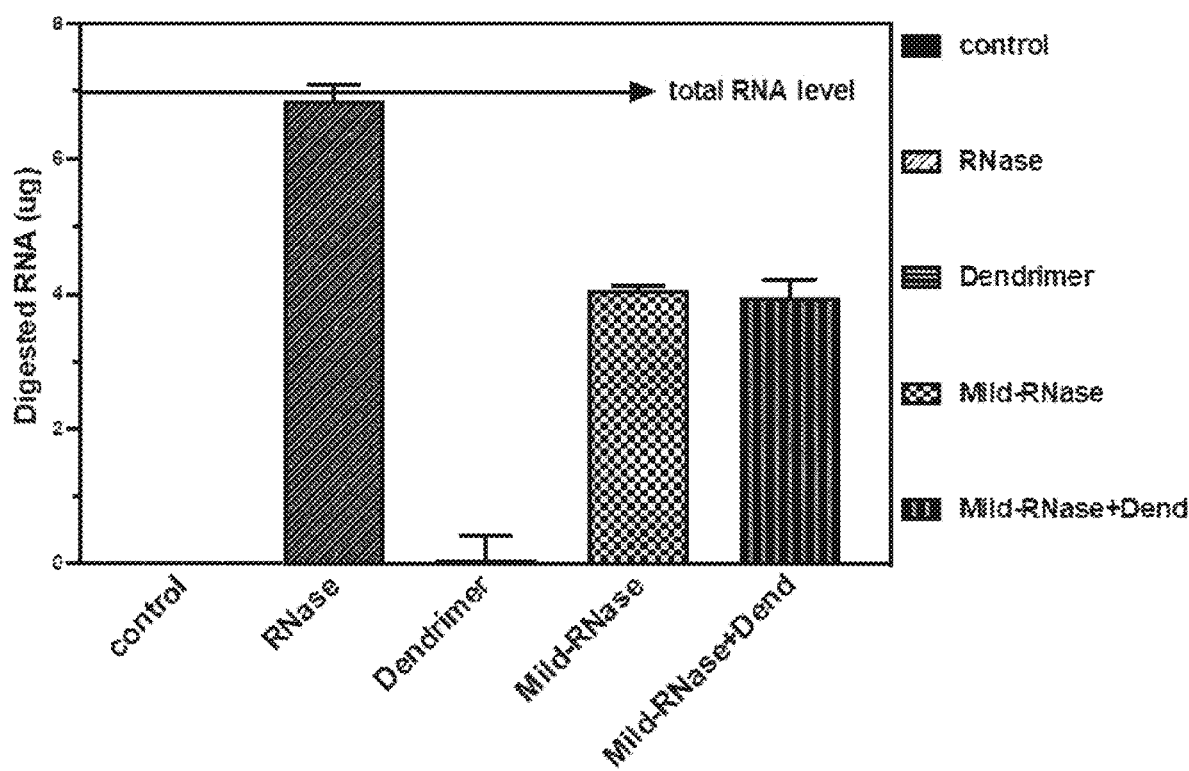
FIG. 33 is a bar graph showing the results of the described experiment.
Figure 34:
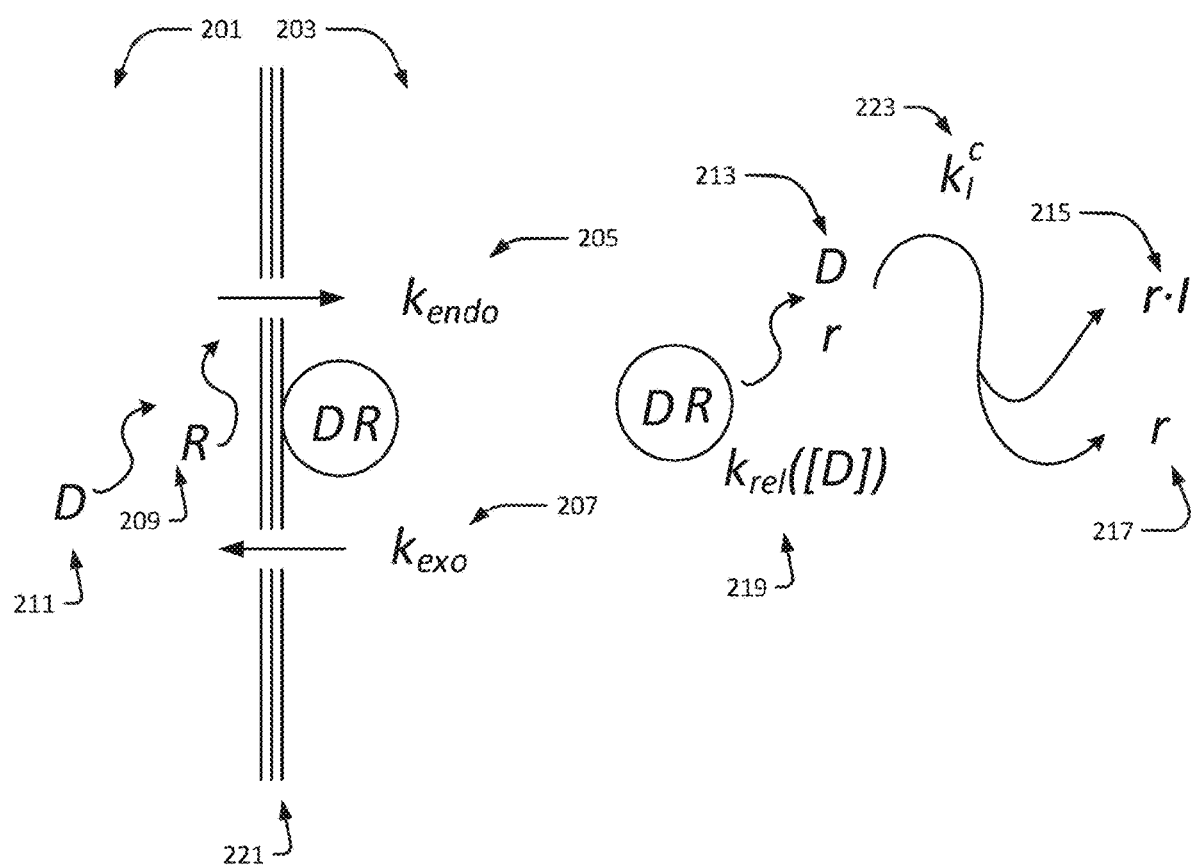
FIG. 34 is a diagram showing a transport/kinetics model of the described unexpected effectiveness of dendrimer/nuclease compositions. Corresponding rate equations offering an explanation of the mechanism are presented in the description below.

Results of the RT-qPCR testing after 5 days are shown in FIG. 28. The virus was undetectable in the medium after 5 days of treatment by the mildly cationized RNase/dendrimer formulation. The graph shows the reactive fluorescence units vs testing cycles the formulation and control viral concentrations. The results for the formulation of mildly cationized RNase (10 µg/mL) and gen 2 PAMAM dendrimer (10µM) are shown as undetected 173, the mildly cationized RNase (10 µg/mL) treated only are shown as detected curves for viral loads of $10^{-6}$ 167, $10^{-5}$ 159, $10^{-4}$ 165, and $10^{-3}$ 163 time dilution, are shown.

FIG. 29 shows a table summarizing the comparative anti-viral effectiveness of all the experimental results. The first 2 columns indicate the associated experiment number according to the previous figures and whether the test well includes a virus sample. The remaining columns indicate the therapeutic formulation and initial component concentrations. Numbers in each cell of the table indicate the reduction (expressed as $\log_{10}$) of virus following introduction of the tested therapeutic. This viral reduction is measured as ratio of the calculated viral load before the therapeutic formulation is added to the calculated viral load at the end-point of the associated experiment. For example values of greater than 1 indicate a substantial reduction of larger than '10-fold' in the amount of the original virus load after the in vitro treatment of the virus in the well with the shown formulation of a nuclease and/or dendrimer. The strong synergistic anti-viral effect of combining the mildly cationic RNase with the gen 2 PAMAM dendrimer are indicated by values of over 5.0 (over 100,000-fold viral load reduction). As detailed above, these results have been confirmed by RT-qPCR testing.

Although the experimental results are presented for in vitro protocols, these results indicate the concentrations and fractional formulations which may be transformed by analogy to in vivo testing protocols and live subject therapeutic formulations. In various embodiments, the therapeutic formulation of mildly cationized RNase is indicated perhaps lower than 7.5 µg/ml and may be higher than the 20 µg/ml tested. In various embodiments, the therapeutic formulation of gen 2 PAMAM dendrimer is indicated at perhaps lower than 10 µM and may be higher than the 20 µM levels tested. In various embodiments, the above concentrations of mildly-cationized RNase and dendrimer may be fractionally combined utilizing at least the ranges of concentrations tested. In various embodiments, the dendrimer may be selected from gen 1 to gen 10 dendrimers, which have increasing numbers of surface or end groups for each dendrimer molecule. As was shown by the unexpected experimental results, the synergistic anti-viral effect of combining the dendrimer and cationic RNase has been demonstrated to be safe and effective (in vitro) for a wide range of formulations, and this effect thus indicates a larger range of component concentrations and a larger range of selected components. For therapeutic administration of the mild-cationic RNase and dendrimer, the concentration and dosage selected are calibrated according to properties of the virus infected animal, including the species, age, sex and weight of the animal.

Although cytotoxic effects of RNase to cancerous cells are known, the unexpected Positive Dendrimer Effect of the formulations described above are unexpected. In alternate embodiments, the unexpected Positive Dendrimer Effect, exhibited in the catalyzing activity/effectiveness when mixing and/or complexing a dendrimer with a cationized nuclease may be utilized as an anticancer therapeutic composition.

In various embodiments, a method of synergistically amplifying nuclease cleaving activity is performed by cationizing the nuclease and using it as a mixture and/or complex with a dendrimer. The mechanism for this unexpected effect, observed for the conditions described above, and whether such a mechanism is independent of intracellular conditions, is explored here.

In an effort to learn more about the mechanism of the Positive Dendritic Effect observed and described above, an additional set of experiments were designed and performed. The basic premise of these experiments was to determine if the mechanism was the result of direct interaction between the virus RNA and dendrimer-RNase complex/mixture independent of cellular interaction or if the mechanism had some other cause.

For this set of experiments, a commercially available yeast based RNA was utilized as the target component of the experiment. To determine the comparative enzymatic effect on RNA of the Positive Dendrimer Effect for an RNAse vs. an RNAse-Dendrimer complex/mixture, RNAse was used to first saturate the RNA. Once the level of saturation (at a given time of 15 minutes at room temperature) was determined, a lower concentration of the mildly-cationized RNAse and mildly-cationized-RNase-dendrimer complex/mixture were used to determine the comparative enzymatic activity of the formulations.

In FIG. 30, the chemical components of experimental formulations are shown, including their stock concentration and concentrations as used. Note that the same PAMAM dendrimer, RNAse, and mildly cationized RNAse were used for this set of experiments as were used in the above experiments. In addition, extra-cellular RNA derived from yeast (Thermo Fisher Scientific, Catalog number: AM7119), was used as the targeted RNA (referred to herein as tRNA or total RNA).

For each experiment, a base mixture of components was prepared, consisting of the chemical and biochemical components listed in FIG. 31, including the total RNA. The components are each included in the concentrations from FIG. 30 in fractional amounts listed in FIG. 31. Note that the quantities listed in FIG. 31 are in microliters (μL). In FIG. 35, the experimental components are listed for each of 6 experiments including a control experiment. As listed, the experiments included a 1) control experiment with water and the base RNA mixture, 2) the base RNA mixture with a saturation concentration of RNAse, 3) the base RNA mixture with the dendrimer alone, 4) the base RNA mixture with a below saturation concentration of mildly cationized RNAse, 5) the base RNA mixture with a below saturation concentration of RNAse and dendrimer, 6) the base RNA mixture with a below saturation concentration of mildly cationized RNAse and dendrimer.

In FIG. 33 a bar graph of the comparative results for this set of experiments for digesting the total RNA are shown. Overall, the results indicate that the inclusion of dendrimer with an RNAse has either no effect or a slightly negative impact on the enzymatic activity of RNAse or mildly-cationized RNAse.

These experimental results underscore the unexpected Positive Dendritic Effect observed in the anti-viral experiments, as such effect was not observed for extra-cellular conditions, in particular, conditions without viral-cellular interaction. The Positive Dendritic Effect is apparently the result of the upstream steps along the pathway from the RNase entry into the cytosol to digestion of the RNA inside cells.

FIG. 34 and the below equations offer a model for the reaction kinetic effects of a dendrimer/RNase mixture or complex for enhancing RNase enzymatic activity inside a cell. On the left side of FIG. 37, the cellular boundary is shown 221, which defines the exterior 201 and interior 203 of the cell. Endocytosis and exocytosis through the cellular boundary for the RNase 209 and dendrimer 211 formulation mixtures are shown with their respective associated rate-constants $k_{endo}$ 205 and $k_{exo}$ 207. The rate constant which reflects the rate that the cell effectuates the release of RNase and dendrimer from endosomes (shown as circles around DR) is defined as a function the concentration of dendrimer [D] and identified as $k_{rel}([D])$ 219. In the presence of RNase inhibitors I, some RNase is bound to the inhibitors, forming r·I 215, and the remainder of "free" released RNase r 217 is available for enzymatic action against RNA. The rate constant reflecting the rate of RNase inhibitor activity while mitigated or reduced as a factor of cationization is identified as $k^c_i$ 223. Based on published results, it is assumed that $k^c_i$ decreases or approaches zero with an increase of the degree of cationization of the RNase. Expressed alternately, the cationization of RNase is antagonistic to RNase inhibitor activity, or cationization decreases the probability of RNase and inhibitor interaction.

In the (steady state) of an experiment such as Example 4 described above and equivalent variation formulations of the dendrimer and nuclease mixture/complex, the concentration [DR] of the endosome contained dendrimer/RNase complex/mixture (inside the cell) may be defined from:

$$\frac{d[DR]}{dt} = k_{endo} \cdot [R] - k_{exo} \cdot [DR] - k_{rel}([D]) \cdot [DR] = 0$$

Where $k_{endo}$ is the rate of RNase endocytosis, $k_{exo}$ is the rate of RNase/dendrimer exocytosis, and $k_{rel}([D])$ is the rate of intracellular release of RNase associated with the concentration of dendrimer. Concentrations of extracellular RNase is identified as [R], intracellular RNase/dendrimer is identified as [DR] and intracellular dendrimer concentration is identified as [D].

At steady state (when the rate of change in [DR] is zero), the concentration of the dendrimer/RNase then is determined to be:

$$[DR] = [R] \cdot \frac{k_{endo}}{k_{exo} + -k_{rel}([D])}$$

Accordingly, the rate of released RNase in cytosol available for enzymatic digestion of (viral) RNA is defined (at steady state when the r rate of change is zero) as:

$$\frac{dr}{dt} = [DR] \cdot k_{rel}([D]) - k_f^c \cdot [I][r] = 0$$

Solving for the concentration of released or available RNase in cytosol [r] 217 gives:

$$[r] = [R] \frac{k_{rel}([D])}{k_f^c \cdot [I]} \cdot \frac{k_{endo}}{k_{exo} + k_{rel}([D])} \propto [R]k_{rel}([D]) \cdot \frac{1}{k_f^c \cdot [I]}$$

Hence, this model for effective released RNase available in cytosol for enzymatic activity in an exemplar embodiment formulation of dendrimer/RNase is unpredictably and counter intuitively proportional to the product of a dendrimer associated metric and an RNase cationization associated metric. In particular, the dendrimer associated metric is the rate of endosome release dendrimer and RNase (as a function of dendrimer concentration), and the RNase associated metric is the inverse of the rate of RNase inhibitor effectiveness against cationized RNase multiplied by the concentration of RNase. By increasing administered dendrimer concentration and RNase cationization, the available "free" RNase increases by at least a product of these rates, rather than an additive or sum of the complex or mixture components, which may otherwise be the predicted effectiveness.

Embodiments include all formulations of a nuclease and dendrimer complex/mixture, such as the exemplar formulations presented in the above experimental results which exhibit an enzymatic effectiveness (the available free released nuclease in cytosol) which exceeds the additive effectiveness of the individual administered nuclease and dendrimer. Enzymatic effectiveness as shown in the examples is directly related to the anti-viral effectiveness in anti-viral formulations.

For embodiment compositions and methods intended to be directed to human therapeutic use, such compositions and methods are subject in the US to FDA approval.

Although specific advantages have been enumerated above, various embodiments may include some, none, or all of the enumerated advantages.

Other technical advantages may become readily apparent to one of ordinary skill in the art after review of the figures and description.

It should be understood that, although exemplary embodiments are illustrated in the figures and described above, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the embodiments of the invention may be used in conjunction with other acoustic environments. The invention in its broader aspects is therefore not limited to the specific details, representative methods, and illustrative examples shown and described. Accordingly, departures may be made from such details without departing from the spirit or scope of applicants' general inventive concept.

What has been described herein is considered merely illustrative of the principles of this invention. Accordingly, it is well within the purview of one skilled in the art to provide other and different embodiments within the spirit and scope of the invention.

For embodiment compositions and methods intended to be directed to human therapeutic use, such compositions and methods are subject in the US to FDA approval.

What has been described herein is considered merely illustrative of the principles of this invention. Accordingly, it is well within the purview of one skilled in the art to provide other and different embodiments within the spirit and scope of the invention.

We claim:

1. A method for treating a mammal infected by an RNA virus, comprising:
administering a therapeutically effective amount of a pharmaceutical composition to the mammal, wherein the pharmaceutical composition comprises an ethylenediamine modified RNAse A mixed with a generation 2 poly PAMAM dendrimer;
wherein the ethylenediamine modified RNase A is in a range of 10 µg/ml to 20 µg/ml and is mildly-cationized to an aggregate net charge of about +11 to +13; and
wherein the PAMAM dendrimer is in a range of 50 µM to 100 µM.

2. The method of claim 1, wherein the ethylenediamine modified RNase A is ethylenediamine modified bovine pancreatic RNase A.

3. The method of claim 1, wherein the virus is a coronavirus.

4. The method of claim 1, wherein the coronavirus is SARS-COV-2 or HCoV-OC43.

5. The method of claim 1, wherein the concentration of ethylenediamine modified RNase A is about 10 µg/ml.

6. The method of claim 1, wherein the concentration of ethylenediamine modified RNase A is about 20 µg/ml.

7. The method of claim 1, wherein the concentration of PAMAM dendrimer is about 50 µM.

8. The method of claim 1, wherein the concentration of PAMAM dendrimer is about 100 µM.

9. The method of claim 1, wherein the concentration of ethylenediamine modified RNase A is about 10 µg/ml and the concentration of PAMAM dendrimer is about 50 µM.

10. A composition for treating a viral infection comprising a therapeutically effective formulation of an ethylenediamine modified RNAse A mixed with a generation 2 poly PAMAM dendrimer; wherein the ethylenediamine modified RNase A is in a range of 10 µg/ml to 20 µg/ml and is mildly-cationized; and wherein the PAMAM dendrimer is in a range of 50 µM to 100 µM.

11. The composition of claim 10, wherein the cationized RNase A is chosen from the group of: RNase A-SO3−, RNaseA-OH, and RNaseA-NH3+.

12. The composition of claim 10, wherein the virus is a coronavirus.

13. The composition of claim 12, wherein the coronavirus is SARS-COV-2 or HCoV-OC43.

* * * * *